United States Patent
Garmark et al.

(10) Patent No.: US 10,440,075 B2
(45) Date of Patent: Oct. 8, 2019

(54) SYSTEMS AND METHODS FOR MULTI-CONTEXT MEDIA CONTROL AND PLAYBACK

(71) Applicant: SPOTIFY AB, Stockholm (SE)

(72) Inventors: Sten Garmark, Stockholm (SE); Karl Magnus Röös, Uppsala (SE); Andreas Öman, Stockholm (SE); Per Gunnar Joachim Bengtsson, Kista (SE); Marcus Per Vesterlund, Stockholm (SE)

(73) Assignee: Spotify AB, Stockholm (SE)

( * ) Notice: Subject to any disclaimer, the term of this patent is extended or adjusted under 35 U.S.C. 154(b) by 422 days.

(21) Appl. No.: 14/411,886

(22) PCT Filed: Jul. 1, 2013

(86) PCT No.: PCT/IB2013/001929
§ 371 (c)(1),
(2) Date: Dec. 29, 2014

(87) PCT Pub. No.: WO2014/001912
PCT Pub. Date: Jan. 3, 2014

(65) Prior Publication Data
US 2015/0199122 A1 Jul. 16, 2015

Related U.S. Application Data

(60) Provisional application No. 61/727,649, filed on Nov. 16, 2012, provisional application No. 61/666,732, filed on Jun. 29, 2012.

(51) Int. Cl.
*H04M 1/725* (2006.01)
*H04L 29/08* (2006.01)
(Continued)

(52) U.S. Cl.
CPC .......... *H04L 65/4069* (2013.01); *G06F 3/165* (2013.01); *H04L 65/1083* (2013.01);
(Continued)

(58) Field of Classification Search
CPC ............. H04L 65/4069; H04L 65/4076; H04L 65/4084; H04L 65/4092; H04L 12/2805;
(Continued)

(56) References Cited

U.S. PATENT DOCUMENTS 7,116,763 B2 * 10/2006 Sifuentes ................ H04M 1/02
379/88.04
7,356,838 B2    4/2008 Madison et al.
(Continued)

FOREIGN PATENT DOCUMENTS

DE    102005033211    1/2007
EP    1845684    10/2007
(Continued)

OTHER PUBLICATIONS

Garmark, Notice of Allowance, U.S. Appl. No. 13/784,704, filed Oct. 13, 2015, 7 pgs.
(Continued)

*Primary Examiner* — Andrew L Tank
(74) *Attorney, Agent, or Firm* — Morgan, Lewis & Bockius LLP

(57) ABSTRACT

A method of remotely controlling an electronic device is disclosed. In some implementations, the method is performed on a server system. The server system receives, from a first electronic device, a first media control request, wherein the first electronic device provides a single user interface that allows a user to both select media content for presentation by the first electronic device and to generate media control requests for transmission to the server system; and the first electronic device also sends a second media
(Continued)

control request to a second electronic device over a local area network to which both the first electronic device and the second electronic device are connected. The server system then sends the received first media control request to the second electronic device, distinct from the first electronic device, wherein the server system and the second electronic device are not on the same local area network.

8 Claims, 12 Drawing Sheets

(51) Int. Cl.
| | |
|---|---|
| H04L 29/06 | (2006.01) |
| H04L 12/28 | (2006.01) |
| G06F 3/16 | (2006.01) |
| H04N 21/433 | (2011.01) |
| G06Q 30/02 | (2012.01) |
| H04W 4/029 | (2018.01) |
| H04H 60/90 | (2008.01) |
| G06F 3/0484 | (2013.01) |
| G06F 3/0482 | (2013.01) |

(52) U.S. Cl.
CPC ...... *H04L 65/1093* (2013.01); *H04L 65/4092* (2013.01); *H04L 67/18* (2013.01); *H04L 67/42* (2013.01); *H04M 1/72558* (2013.01); *H04N 21/433* (2013.01); *G06F 3/0482* (2013.01); *G06F 3/04842* (2013.01); *G06F 3/04847* (2013.01); *G06Q 30/0267* (2013.01); *H04H 60/90* (2013.01); *H04L 12/2805* (2013.01); *H04L 67/104* (2013.01); *H04W 4/029* (2018.02)

(58) Field of Classification Search
CPC . H04L 67/18; H04L 65/1093; H04L 65/1083; H04L 67/42; H04L 67/104; H04N 21/40; H04N 21/4826; H04N 21/433; G06F 3/165; G06F 3/0482; G06F 3/04847; G06F 3/04842; G06Q 30/0267; H04M 1/72558; H04H 60/90; H04W 4/029
USPC ........................................................ 715/740
See application file for complete search history.

(56) References Cited

U.S. PATENT DOCUMENTS

| 7,571,014 | B1* | 8/2009 | Lambourne | H04R 27/00 |
| | | | | 700/94 |
| 9,195,383 | B2 | 11/2015 | Garmark et al. | |
| 9,204,100 | B2 | 12/2015 | White et al. | |
| 9,635,068 | B2 | 4/2017 | Garmark et al. | |
| 2001/0001160 | A1 | 5/2001 | Shoff | |
| 2004/0068756 | A1 | 4/2004 | Chiu | |
| 2004/0068766 | A1 | 4/2004 | Poulsen et al. | |
| 2004/0133908 | A1 | 7/2004 | Smith et al. | |
| 2004/0249815 | A1 | 12/2004 | Lee | |
| 2005/0028208 | A1 | 2/2005 | Ellis et al. | |
| 2005/0251566 | A1 | 11/2005 | Weel | |
| 2005/0251576 | A1 | 11/2005 | Weel | |
| 2005/0289236 | A1 | 12/2005 | Hull et al. | |
| 2006/0026636 | A1 | 2/2006 | Stark et al. | |
| 2006/0248557 | A1 | 11/2006 | Stark et al. | |
| 2008/0040332 | A1 | 2/2008 | Lee et al. | |
| 2008/0158000 | A1* | 7/2008 | Mattrazzo | H04M 1/05 |
| | | | | 340/4.4 |
| 2008/0200154 | A1* | 8/2008 | Maharajh | G06F 17/30035 |
| | | | | 455/414.3 |
| 2008/0244681 | A1 | 10/2008 | Gossweiler et al. | |
| 2009/0063703 | A1 | 3/2009 | Finkelstein et al. | |
| 2009/0138507 | A1* | 5/2009 | Burckart | G11B 27/105 |
| 2009/0172757 | A1 | 7/2009 | Aldrey et al. | |
| 2009/0199254 | A1 | 8/2009 | White et al. | |
| 2009/0241143 | A1 | 9/2009 | White et al. | |
| 2009/0241149 | A1* | 9/2009 | Yoshioka | H04N 7/17318 |
| | | | | 725/87 |
| 2010/0037274 | A1 | 2/2010 | Meuninck et al. | |
| 2010/0067378 | A1 | 3/2010 | Cohen et al. | |
| 2010/0121891 | A1 | 5/2010 | Zampiello | |
| 2010/0121961 | A1 | 5/2010 | Elleuch et al. | |
| 2010/0153846 | A1* | 6/2010 | Roy | G06F 17/30749 |
| | | | | 715/716 |
| 2010/0262675 | A1 | 10/2010 | Meuninck et al. | |
| 2011/0063506 | A1 | 3/2011 | Reams | |
| 2011/0110275 | A1 | 5/2011 | Shaheen | |
| 2011/0131332 | A1 | 6/2011 | Bouazizi | |
| 2011/0131520 | A1 | 6/2011 | Al-Shaykh et al. | |
| 2011/0196973 | A1 | 8/2011 | Shaheen et al. | |
| 2011/0219105 | A1 | 9/2011 | Kryze et al. | |
| 2012/0023532 | A1 | 1/2012 | Wong et al. | |
| 2012/0029672 | A1* | 2/2012 | Hamilton | G11B 27/034 |
| | | | | 700/94 |
| 2012/0078997 | A1* | 3/2012 | Evans | G06Q 10/00 |
| | | | | 709/203 |
| 2012/0084356 | A1 | 4/2012 | Ferdi | |
| 2012/0117632 | A1 | 5/2012 | Curtis et al. | |
| 2012/0198350 | A1 | 8/2012 | Nhiayi | |
| 2013/0034197 | A1 | 2/2013 | Aweya et al. | |
| 2014/0006947 | A1 | 1/2014 | Garmark et al. | |
| 2014/0214927 | A1 | 7/2014 | Garmark et al. | |
| 2014/0215334 | A1 | 7/2014 | Garmark et al. | |
| 2014/0373077 | A1* | 12/2014 | Rumreich | H04N 21/4333 |
| | | | | 725/78 |
| 2015/0003816 | A1* | 1/2015 | Clapper | H04N 9/8715 |
| | | | | 386/343 |
| 2015/0026746 | A1 | 1/2015 | Fondberg et al. | |
| 2015/0199122 | A1 | 7/2015 | Garmark et al. | |

FOREIGN PATENT DOCUMENTS

| EP | 2160029 | 3/2010 |
| WO | WO 2007/101182 | 9/2007 |

OTHER PUBLICATIONS

Garmark, Office Action, U.S. Appl. No. 14/950,863, filed May, 9, 2016, 6 pgs.
Garmark, Office Action, U.S. Appl. No. 13/928,306, filed Jun. 3, 2016, 12 pgs.
Garmark, Final Office Action, U.S. Appl. No. 13/928,306, filed Nov. 18. 2016, 14 pgs.
Sonicblue Inc., Replay TV 5000 User Manual, © 2002 SONICblue Incorporated, 86 pgs.
Spotify AB, International Preliminary Report on Patentablity, PCT/IB2013/001929, dated Jan. 8, 2015, 44 pgs.
Spotify AB, Extended European Search Report, EP15192958.5, dated Feb. 18, 2016, 11 pgs.
Garmark, Office Action, U.S. Appl. No. 13/784,704, filed Apr. 7, 2015, 23 pgs.
Communication Pursuant to Rule 161(2) and 162 EPC, EP13766665.7, Feb. 17, 2015, 2 pgs.
Spotify AB, International Preliminary Report on Patentability, PCT/IB2013/001938, dated Dec. 31, 2014, 19 pgs.
Spotify AB, International Preliminary Report on Patentability, PCT/IB2013/001945, dated Dec. 31, 2014, 19 pgs.
Anonymous, Last.fm, en.wikipedia.org/w/index.php?title=Last.fm&oldid=499039710, Jun. 23, 2012, pp. 16.
Katz, Playlist-Based Radio, Post to Tumblr and embeddable Play Buttons Come to Spotify for Windows and Mac OS, Spotify blog, May 11, 2012, 1 pg.
O'Neill, The Complete Guide to YouTube Playlists, Oct. 21, 2010, 1 pg.
Spotify AB, International Search Report and Written Opinion, PCT/IB2013/001929, dated Feb. 26, 2014, 53 pgs.
Spotify AB, International Search Report and Written Opinion, PCT/IB2013/001938, dated Dec. 19, 2013, 23 pgs.

(56) References Cited

OTHER PUBLICATIONS

Spotify AB, International Search Report and Written Opinion, PCT/IB2013/001945, dated Dec. 18, 2013, 22 pgs.
Spotify AB, Invitation to Pay Additional Fees, PCT/IB2013/001929, dated Dec. 18, 2013, 8 pgs.
Garmark, Notice of Allowance, U.S. Appl. No. 14/950,863, dated Dec. 23, 2016, 5 pgs.
Garmark, Office Action, U.S. Appl. No. 13/928,306, dated Aug. 30, 2017, 14 pgs.
Garmark, Office Action, U.S. Appl. No. 15/495,823, dated Aug. 21, 2017, 6 pgs.
Spotify AB, Extended European Search Report, EP17204527.0, dated Mar. 8, 2018, 11 pgs.
Sujeet Mate et al., "Movable-multimedia: Session Mobility in Ubiquitous Computing Ecosystem," 5th International Conference on Mobile and Ubiquitous Multimedia: MUM 2006, Dec. 4-6, 2006, Stanford, California, USA, 5 pgs.
Garmark, Notice of Allowance, U.S. Appl. No. 15/495,823, dated Nov. 29, 2017, 5 pgs.
Spotify AB, Communication Pursuant to Article 94(3), EP13766665.7, Dec. 1, 2017, 9 pgs.
Garmark, Office Action, U.S. Appl. No. 13/928,306, dated Nov. 5, 2018, 15 pgs.
Garmark, Final Office Action, U.S. Appl. No. 13/928,306, dated Feb. 26, 2019, 17 pgs.

\* cited by examiner

SYSTEMS AND METHODS FOR MULTI-CONTEXT MEDIA CONTROL AND PLAYBACK

CROSS REFERENCE TO RELATED APPLICATIONS

This Application is a United States National Stage Application filed under 35 U.S.C. § 371 of PCT Patent Application Serial No. PCT/IB2013/001929 filed on Jul. 1, 2013, which claims the benefit of and priority to U.S. Provisional Patent Application No. 61/666,732 filed on Jun. 29, 2012, and U.S. Provisional Patent Application No. 61/727,649 filed on Nov. 16, 2012, which are hereby incorporated by reference in their entireties.

TECHNICAL FIELD

The disclosed implementations relate generally to controlling media content presentation devices.

BACKGROUND

Modern users have a variety of options for devices and ways to consume media content. For example, multiple different types of media, including text, still images, video, audio, and other digital media, can be consumed on personal computers, laptops, mp3 players, mobile phones, tablet computers, televisions, stereos, and many other electronic devices. These electronic devices typically have the ability to store digital media files in memory that is integrated into the devices. But acquiring and storing all the media content to which a user desires access can be prohibitively difficult and expensive.

Current technology also allows users to stream digital media content to their electronic devices over local networks or the Internet, for example, including over wireless connections. Streaming services allow users to have access to a much larger collection of media than would otherwise be possible. Streaming services store media content on servers remote from the electronic devices, and then send the media content to the electronic devices when it is requested. The media content is then cached on the electronic device for presentation. In some cases, the content may be temporarily buffered/stored before presentation, but typically the data is deleted from memory after presentation, allowing an almost unlimited amount of media to be streamed to a device without running out of storage space on the device. Some streaming services also allow streamed content to be stored on the local device.

As more and more devices are capable of streaming media content from remote servers, as well as storing media content locally, it is often cumbersome to manage all of the different sources of media to which a user has access. Moreover, even where a user has multiple devices that can access the same content (for example, a handheld device and a laptop computer that can both access a media streaming service), each device must typically be controlled with its own dedicated interface. Accordingly, it would be advantageous to provide systems and methods that allow a user to remotely control various electronic devices in a simple and intuitive manner.

SUMMARY

Methods and systems for controlling an electronic device through a user interface are described, where the user interface is capable of controlling media presentation at the device on which the user interface is provided, as well as other devices. For example, a first electronic device (e.g., a smartphone) provides a single user interface that allows a user both to select media content for presentation by the first electronic device, and to generate media control requests that control media presentation at a second electronic device (e.g., a home audio receiver). In order to control the second device, the first electronic device sends media control requests to the device directly (e.g., within a local area network), as well as to a remote server. The remote server may be provided by, or associated with, a media content provider that streams or otherwise provides media content (e.g., music) to devices via the Internet. The remote server, in turn, can either forward the media control request to the second device, or otherwise cause the second device to implement the media control function requested by the user.

Also described are methods and systems for enabling a media presentation context to be available to multiple devices. For example, context information, such as the play history, current location within a media file, etc., are made available at a second electronic device when a media stream is sent to the second electronic device instead of (or in addition to) the first electronic device. This way, if a user initiates presentation of media content at a second electronic device, and then wishes to control the media stream via the that device, the same context (e.g., play history, current location, etc.) is available via the second device. Context information associated with a device (and/or a user of a device) may be stored, for example, on a server associated with a media content provider, and provided to various devices when certain conditions are satisfied.

Also described are methods and systems for automatically transferring a media content data stream from one device to another. For example, if a user is listening to music on a smart phone while she is walking to her house, it is possible to detect when she arrives home, and automatically, and without user input, cause her home stereo to begin playing the same music (e.g., the same radio station, playlist, podcast, track, video, etc.) via her home stereo. Thus, the user can be provided with a seamless, uninterrupted media experience between several devices and locations.

Also described are methods and systems for controlling an electronic device, for example, that has only a limited set of controls. The media presentation context associated with a user and/or the user's devices is also used to provide extended control options with the limited set of controls. For example, a user can press a "play" button at a first device in order to synchronize the first device to music that is being presented by another device. As another example, a user can press a "play" button on a first device while that device is playing back a song, and the device will begin playing other songs that are related to the song (e.g., from a playlist of similar songs or artists, etc.).

Further details and specific implementations of these methods and associated systems and/or devices are discussed herein.

EXEMPLARY IMPLEMENTATIONS

In accordance with some implementations, a method of remotely controlling an electronic device is disclosed. In some implementations, the method is performed on a server system having one or more processors and memory storing one or more programs for execution by the one or more processors. The server system receives, from a first electronic device, a first media control request, wherein the first electronic device provides a single user interface that allows a user to both select media content for presentation by the first electronic device and to generate media control requests for transmission to the server system; and the first electronic device also sends a second media control request to a second electronic device over a local area network to which both the first electronic device and the second electronic device are connected. The server system then sends the received first media control request to the second electronic device, distinct from the first electronic device, wherein the server system and the second electronic device are not on the same local area network as each other.

In accordance with some implementations, a system for remotely controlling an electronic device is disclosed. The system has one or more processors and memory storing one or more programs to be executed by the one or more processors. The one or more programs include instructions which cause the system to receive, from a first electronic device, a first media control request, wherein the first electronic device provides a single user interface that allows a user to both select media content for presentation by the first electronic device and to generate media control requests for transmission to the server system; and the first electronic device also sends a second media control request to a second electronic device over a local area network to which both the first electronic device and the second electronic device are connected. The server system then sends the received first media control request to the second electronic device, distinct from the first electronic device, wherein the server system and the second electronic device are not on the same local area network as each other.

In accordance with some implementations, a non-transitory computer readable storage medium storing one or more programs configured for execution by a server system is disclosed. The one or more programs include instructions which cause the system to receive, from a first electronic device, a first media control request, wherein the first electronic device provides a single user interface that allows a user to both select media content for presentation by the first electronic device and to generate media control requests for transmission to the server system; and the first electronic device also sends a second media control request to a second electronic device over a local area network to which both the first electronic device and the second electronic device are connected. The server system then sends the received first media control request to the second electronic device, distinct from the first electronic device, wherein the server system and the second electronic device are not on the same local area network as each other.

In accordance with some implementations, a method of making a media player context available at a second electronic device in response to beginning to stream media content to the second electronic device is disclosed. In some implementations, the method is performed on a server system having one or more processors and memory storing one or more programs for execution by the one or more processors. The server system transmits a media content stream to a first electronic device for presentation by the first electronic device. The server system stores context information associated with the transmission of the media content stream to the first electronic device. The server system then receives a user request to cease transmitting the media content stream to the first electronic device and begin transmitting the media content stream to a second electronic device. In some implementations, in response to receiving the user request, the server system ceases to transmit the media content stream to the first electronic device, such that the context information associated with the transmitted media content stream is no longer available at the first electronic device. For example, in some cases, once a media stream is transmitted to the second electronic device instead of the first, the media context (e.g., play history, current location) is also removed from, or otherwise no longer available to the first device. In some implementations, the server system also transmits the media content stream to the second electronic device for presentation by the second electronic device, wherein the context information associated with the transmitted media content stream is available to the second electronic device.

In accordance with some implementations, a system for making a media player context available at a second electronic device in response to beginning to stream media content to the second electronic device is disclosed. The system has one or more processors and memory storing one or more programs to be executed by the one or more processors. The one or more programs include instructions that cause the system to transmit a media content stream to a first electronic device for presentation by the first electronic device. The server system stores context information associated with the transmission of the media content stream to the first electronic device. The server system then receives a user request to cease transmitting the media content stream to the first electronic device and begin transmitting the media content stream to a second electronic device. In some implementations, in response to receiving the user request, the server system ceases to transmit the media content stream to the first electronic device, such that the context information associated with the transmitted media content stream is no longer available at the first electronic device, as described above. The server system also transmits the media content stream to the second electronic device for presentation by the second electronic device, wherein the context information associated with the transmitted media content stream is available at the second electronic device.

In accordance with some implementations, a non-transitory computer readable storage medium storing one or more programs configured for execution by a server system is disclosed. The one or more programs include instructions that cause the system to transmit a media content stream to a first electronic device for presentation by the first electronic device. The server system stores context information associated with the transmission of the media content stream to the first electronic device. The server system then receives a user request to cease transmitting the media content stream to the first electronic device and begin transmitting the media content stream to a second electronic device. In some implementations, in response to receiving the user request, the server system ceases to transmit the media content stream to the first electronic device, such that the context information associated with the transmitted media content stream is no longer available at the first electronic device, as described above. The server system also transmits the media content stream to the second electronic device for presentation by the second electronic device, wherein the context information associated with the transmitted media content stream is available to the second electronic device.

In accordance with some implementations, a method of automatically changing the device to which a media content data stream is sent is disclosed. In some implementations, the method is performed on a server system having one or more processors and memory storing one or more programs for execution by the one or more processors. The server system transmits a media content stream to a first electronic device for presentation by the first electronic device. The server system receives a transfer request to cease transmitting the media content stream to the first electronic device and begin transmitting the media content stream to a second electronic device, wherein the transfer request is generated automatically and without user input in accordance with a determination that a predetermined condition is met. In response to receiving the transfer request, the server system ceases to transmit the media content stream to the first electronic device. The server system then transmits the media content stream to the second electronic device for presentation by the second electronic device.

In accordance with some implementations, a system for automatically transferring a media content data stream is disclosed. The system has one or more processors and memory storing one or more programs to be executed by the one or more processors. The one or more programs include instructions which cause the system to transmit a media content stream to a first electronic device for presentation by the first electronic device. The server system receives a transfer request to cease transmitting the media content stream to the first electronic device and begin transmitting the media content stream to a second electronic device, wherein the transfer request is generated automatically and without user input in accordance with a determination that a predetermined condition is met. In response to receiving the transfer request, the server system ceases to transmit the media content stream to the first electronic device. The server system then transmits the media content stream to the second electronic device for presentation by the second electronic device.

In accordance with some implementations, a non-transitory computer readable storage medium storing one or more programs configured for execution by a server system is disclosed. The one or more programs include instructions which cause the system to transmit a media content stream to a first electronic device for presentation by the first electronic device. The server system receives a transfer request to cease transmitting the media content stream to the first electronic device and begin transmitting the media content stream to a second electronic device, wherein the transfer request is generated automatically and without user input in accordance with a determination that a predetermined condition is met. In response to receiving the transfer request, the server system ceases to transmit the media content stream to the first electronic device. The server system then transmits the media content stream to the second electronic device for presentation by the second electronic device.

In accordance with some implementations, a portable electronic device or a computer system is provided, comprising: one or more processors; and memory storing one or more programs for execution by the one or more processors, the one or more programs including instructions for performing any of the methods described herein.

In accordance with some implementations, a computer readable storage medium storing one or more programs is provided, the one or more programs comprising instructions, which, when executed by a portable electronic device or a computer system with one or more processors, cause the device to perform any of the methods described herein.

In accordance with some implementations, a portable electronic device or a computer system is provided, comprising: means for performing any of the methods described herein.

In accordance with some implementations, an information processing apparatus for use in a portable electronic device or a computer system is provided, comprising: means for performing any of the methods described herein.

In accordance with some implementations, a portable electronic device or a computer system is provided, comprising: a processing unit configured to perform any of the methods described herein.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Figure 1A:
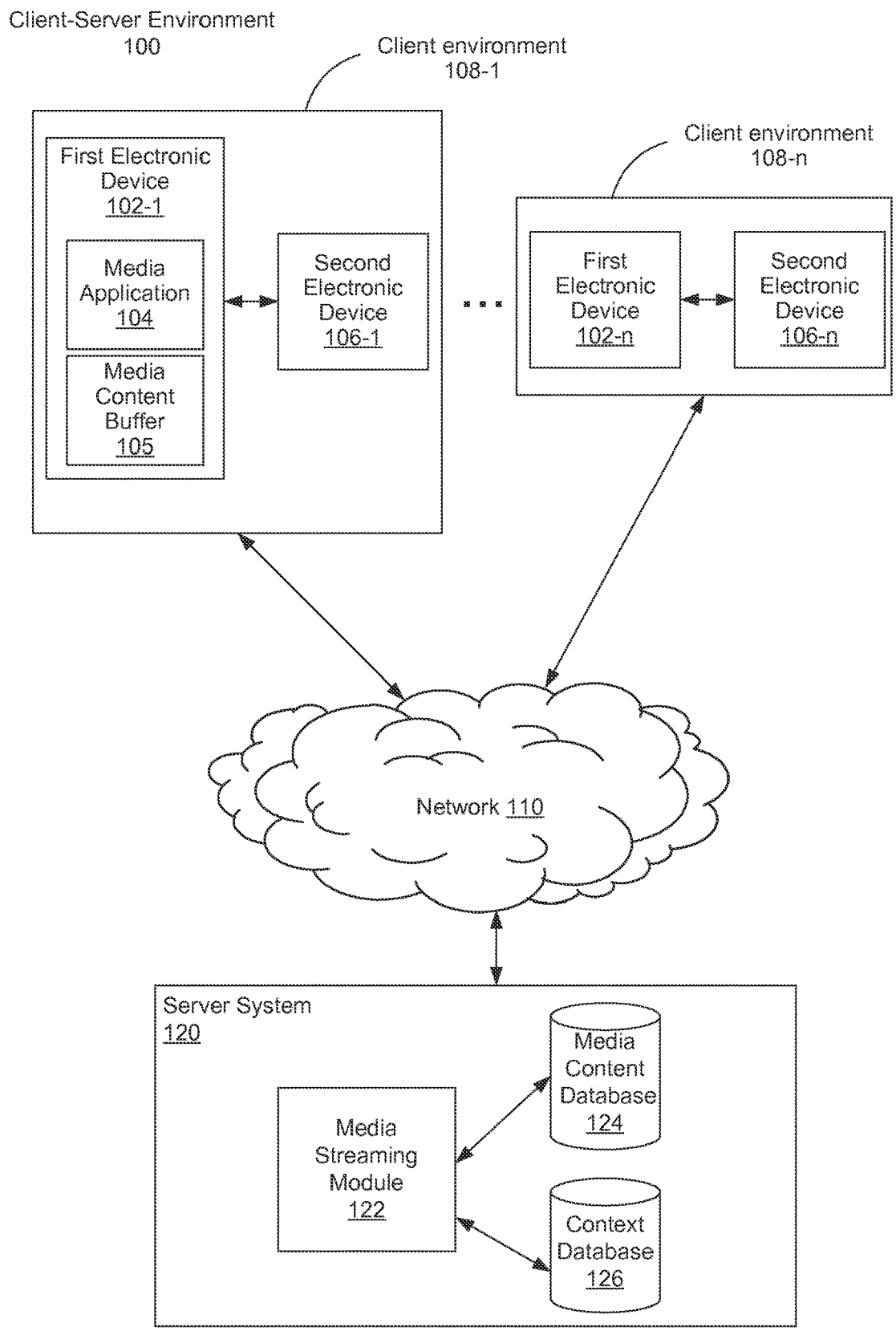
FIG. 1A is a block diagram illustrating a client-server environment, according to some implementations.

Some implementations described herein enable a first electronic device to both present media content and remotely control media presentation by a second electronic device. In particular, the disclosed implementations enable a user with a first electronic device to both request media content to be presented by the first electronic device, and also to request media content to be presented by a second electronic device. For example, a user may request, via a media player application, to playback a media content item (e.g., a music track) on a handheld device such as a smart phone. The user may also, use the same handheld device as a remote control to control the playback (and/or other functionalities) of a second device, such as a laptop computer, a home media receiver, or a home audio/visual system. Thus, the first device, which is distinct and remote from the second device, can both present media and control other media devices.

One benefit of the disclosed ideas is that the same application is used for both presenting media content by the first electronic device and for controlling the presentation of media by the second electronic device. Indeed, the same user interface can be used for controlling the local presentation of media content and for controlling the presentation of media content by the second device. This provides a seamless experience for the user, as different control schemes need not be learned for different devices. Moreover, where media content is streamed from a remote server to various user devices, the user may be able to remotely control many different devices, even when the remote control device cannot communicate to the other devices directly (e.g., via local, peer-to-peer communications).

Accordingly, in some implementations described herein, requests for media content (and/or other media control requests) are sent from a first electronic device to a server system located remotely from the first electronic device. The server system then causes a second electronic device to present media in accordance with the request from the first electronic device.

In some implementations, the server system is located remotely from both the first and the second electronic devices. In some implementations, the first and second electronic devices are located on the same local area network. A local area network is a network of electronic devices that spans a relatively small geographical area. The server system is not located on the same local area network as either the first electronic device or the second electronic device. Those skilled in the art will recognize that local area networks are typically confined to a single building or a group of buildings in geographical proximity.

Furthermore, communication between the server system and the first and second electronic device is over a network such as the Internet, through standard TCP/IP communication protocols. In contrast, the first and second electronic devices can communicate over a local area network, or over a local wireless communication protocol, such as Bluetooth.

Some implementations described herein enable a user using a first electronic device to receive a stream (e.g., from a server) of media content for presentation by the first electronic device, and to request that the server transfer and/or simultaneously stream the media content stream to a second electronic device. After the stream is sent to the second electronic device (e.g., in response to a user selection requesting that the media be presented via a different device), the context of the content stream, originally available on the first device, is made available on the second electronic device. The context of a content stream includes various information about the content stream, including the playback position of any currently playing media content, a play history of previously presented media content, a "pause" position of previously presented media content, the media content to be played next, etc. For example, the content stream, once transferred to the second electronic device, will retain the position in the media content and the playlist associated with the media content. In some implementations, once the media content stream is transferred to the second electronic device, the context is no longer available at the first electronic device. For example, once a media content stream begins playing at the second electronic device, the media content stream, along with the context of the media content stream, is no longer synchronized with or sent to the first electronic device.

In other implementations described herein, the server system changes the destination of the content stream from the first electronic device to the second electronic device automatically, without any user input involved in generating the transfer request. The switching occurs in response to receiving notification from the first electronic device that a specific predetermined condition has been met. For example, the first electronic device may monitor its geographic location, and when it determines that it has moved into (or out of) a predefined area, the first electronic device will send a notification to the server system that this condition has been met. In another example, the condition is met when the server detects a change in the state of the first electronic device, such as when the first electronic device establishes communication with a particular wireless network. In response, the server system ceases transmitting the media content stream to the first electronic device and begins transmitting the media content stream to a second electronic device. Any appropriate electronic device may determine whether the condition is met, including client devices, server systems, and/or any combination of these or other devices.

In some implementations, the user is able to establish the conditions for automatically sending a stream transfer request to the server system. For example, the first electronic device, such as a smart phone, may detect that it has arrived at the user's home, and automatically cause the music that it was just delivering to the user via headphones to be presented via the user's home stereo system instead.

Some implementations described herein enable remote control of media content presentation by an electronic device from a set of media controls embedded in a webpage. The controls embedded in the webpage allow a user to request playback of media content associated with the embedded controls by a device distinct from the device displaying the web page.

Some implementations described herein provide for location-aware remote control methods and systems. These can be used, for example, to allow a single remote control device to control multiple different media presentation devices (such as televisions, home stereo systems, wireless speakers, and the like) without requiring the user to manually select which device to control. Accordingly, in some implementations, an electronic device (e.g., a smart phone, dedicated remote control unit, laptop computer, tablet computer, etc.) is capable of acting as a remote control to a plurality of media presentation devices. The location of the remote control, or the proximity of the remote control to one or more of the media presentation devices, may be used to identify which particular media presentation device should be controlled by the remote control. In some implementations, the remote control will be automatically configured to control only the closest media presentation device(s). Thus, a user can easily control the media presentation device(s) that are nearby, without having to specifically select those devices on the remote control.

For example, a smart phone may be configured to act as a remote control device for a number of independently controllable speaker units in various places throughout a house. If a user is in one room, and selects a media presentation control, the remote control (or another device associated with the remote control, such as the speaker units, a remote server, a local device controller, a combination of these or other devices, etc.) may select only those speaker units which are in the same room to receive and/or respond to the control request. Thus, if a user is listening to music in a bedroom on one set of speakers, and selects a "pause" control on a smart phone, the bedroom speakers will be paused. If the user then moves to the kitchen and selects a "play" control on the smart phone, playback will be resumed at the kitchen speakers, rather than the bedroom speakers.

In some implementations, the closest speaker unit to the remote control is selected to act on or receive a control request. In some implementations, the closest 2, 3, 4, 5, or more speakers to the remote control are selected to act on or receive a control request. In some implementations, speaker units (or other presentation devices) may be grouped, such that when a user is in certain locations, one or more predefined groups of speaker units are selected. For example, if a user is on one floor of their house, the remote control may control all appropriate media presentation devices on that floor.

In some implementations, proximity to media presentation devices is determined using WiFi signals, BLUETOOTH signals, GPS devices and/or signals, sonic or ultrasonic signals, infrared signals, RFID, near-field-communication techniques, or any appropriate technique. In some implementations, instead of controlling the closest speakers, the remote control device controls those media presentation devices that are most likely to be intended by the user. For example, if a user is near a wall in one room, the closest speaker unit may be in a different room. In this case, the control request may be issued to the speakers that the user did not intend to control. In some implementations, the location of a remote control device is determined (e.g., an absolute or semi-absolute location, rather than just a relative proximity to a given device), and the location can be correlated with one or more media presentation devices that should be controlled. In some implementations, a user can override the automatic selection of the target device.

In some implementations, various remote control devices may be linked to one or more predetermined media presentation devices in a user's environment. For example, a desktop computer may be configured to automatically control one set of media presentation devices (e.g., all those in the same room as the desktop computer), while a smart phone is configured to control to automatically control another set of media presentation devices (e.g., all those in the kitchen).

Attention is now directed to the figures, and in particular FIG. 1A, which is a block diagram of a client-server environment, according to some implementations. The client-server environment 100 includes one or more client environments (108-1 ... 108-n) and a server system 120 that are connected through a network 110. In some implementations, the client environment 108-1 includes one or more electronic devices (first electronic device 102-1, second electronic device 106-1) within the client environment 108-1. The server system 120 includes a media streaming module 122, a media content database 124, and a context database 126. The network 110 includes any of a variety of networks, including wide area networks (WAN), wireless networks, wired networks, the Internet, or a combination of such networks.

In accordance with some implementations, the client environment 108-1 includes a first electronic device 102-1. The first electronic device 102-1 is one of the group of: a personal computer, a mobile electronic device, a laptop, a tablet computer, a smart phone, a digital media player, or any other electronic device able to present media content. In some implementations, the first electronic device 102-1 includes a media content presentation and control application 104 (hereinafter "media application"). The media application 104 is able to control the presentation of media by the electronic device 102-1. For example, the media application 104 enables a user to navigate media content items, select media content items for playback on the electronic device 102-1, create and edit playlists, select devices on which to present media content, etc. In some implementations, media content is stored by the first electronic device 102-1 itself. In other implementations, the media content is stored by a server system 120, which may be located remotely from the first electronic device 102-1 (e.g., outside a local area network to which the first electronic device 102-1 is connected). The media content is then streamed from the server system 120 to the first electronic device 102-1 over the network 110.

In some implementations, the data streamed from the server system 120 is temporarily stored/cached by the first electronic device 102-1 in the media content buffer 105 in the memory of the first electronic device 102-1. In some implementations, media content stored in the media content buffer 105 is removed after the media content is presented by the first electronic device 102-1, allowing new media content data to be stored in the buffer 105. In other implementations, at least some of the media content stored in the media content buffer 105 is retained for a predetermined amount of time after the content is presented by the first electronic device 102-1 and/or until other predetermined conditions are satisfied.

In some implementations, the media application 104 is also able to control media content presentation by a second electronic device 106-1, distinct from the first electronic device 102-1. Thus, the user is able to use the media application 104 to cause the electronic device 102-1 to act both as a device for presenting media content and as a remote control for other devices presenting media content. This allows a user to control media presentation on multiple electronic devices from within a single application 104, and/or using a single user interface.

In some implementations, when a user wants to use the first electronic device 102-1 to control media presentation by the second electronic device 106-1, the user interacts with the media application 104 to send a media control request to the server system 120. The server system 120 receives the media control request over the network 110. For example, the user may press a button on a touchscreen of the first electronic device 102-1 in order to send the media control request to the server system 120. As described below, the media control request is, for example, a request to begin presentation of the current media content by the second electronic device 106-1. Though often used herein to describe requests to initiate or begin presentation of media by the second electronic device 106-1, in some implementations, media control requests also include requests and/or signals to control other aspects of the media that is being presented on the second electronic device 106-1, including but not limited to commands to pause, skip, fast-forward, rewind adjust volume, change the order of items in a playlist, add or remove items from a playlist, adjust audio equalizer settings, change or set user settings or preferences, and the like.

In accordance with some implementations, both the first electronic device 102-1 and a second electronic device 106-1 are on the same local area network. As noted above, a local area network is a network of electronic devices that typically spans a relatively small geographical area. The server system 120 is not located on the same local area network as either the first electronic device 102-1 or the second electronic device 106-1.

The client server environment 100 also includes a server system 120. In some implementations, the server system includes a media streaming module 122, a media content database 124, and a context database 126. The media content database 124 stores the data necessary to present media content by an electronic device. In some implementations, the media content database includes data stored in different formats and file types to allow a variety of different devices to receive streamed content. In some implementations, the data is stored in a single file format and is converted/transcribed to the appropriate data type before or as it is streamed to a remote device.

In some implementations, the server system 120 includes a media streaming module 122. The media streaming module 122 receives media control request from electronic devices and streams media content in response. For example, a user who is streaming music to a smart phone causes a media control request to be sent to the server using the same application that he was using to consume the media on the smart phone. The server system 120 then sends the media control request to a second electronic device, distinct from the first electronic device. In some implementations, the received media control request includes information identifying the electronic device to which the server system 120 should forward the media control request.

In some implementations, the server system 120 includes a context database 126. The context database 126 stores data associated with the presentation of media content by an electronic device. The context database 126 includes, among other things, the current position in the media content stream (e.g., a timestamp), a playlist associated with the media content stream, previously played content, skipped pieces of media content, and previously indicated user preferences. For example, the context database may include that the content stream currently is presenting a song, at 1 minute and 23 seconds into the song, as well as all the songs played in the last hour and the next 20 songs in the playlist. The server system 120 transmits the context associated with a media content stream along with the media content stream.

In some implementations, the server system 120 transmits the media content stream to a first electronic device (e.g., first electronic device 102-1) for presentation by the first electronic device. In response to a user request (or an automatically generated request, as described below), the first electronic device 102-1 sends media control requests 112 to the server system 120. The server system changes the target device for the media content stream based on the media control requests received from an electronic device 102-1. In some implementations, as described below with respect to FIG. 2, the first electronic device 102-1 device also sends a second media control request directly to the second electronic device 106-1 over a local area network to which both the first electronic device 102-1 and the second electronic device 106-1 are connected. The second media control request includes the same or analogous commands as the media control requests, and are sent to the second electronic device 106-1 directly (e.g., via the local area network), for example, to increase communication redundancy, and to provide remote control functions via multiple channels to increase user friendliness and reliability.

Figure 1B:
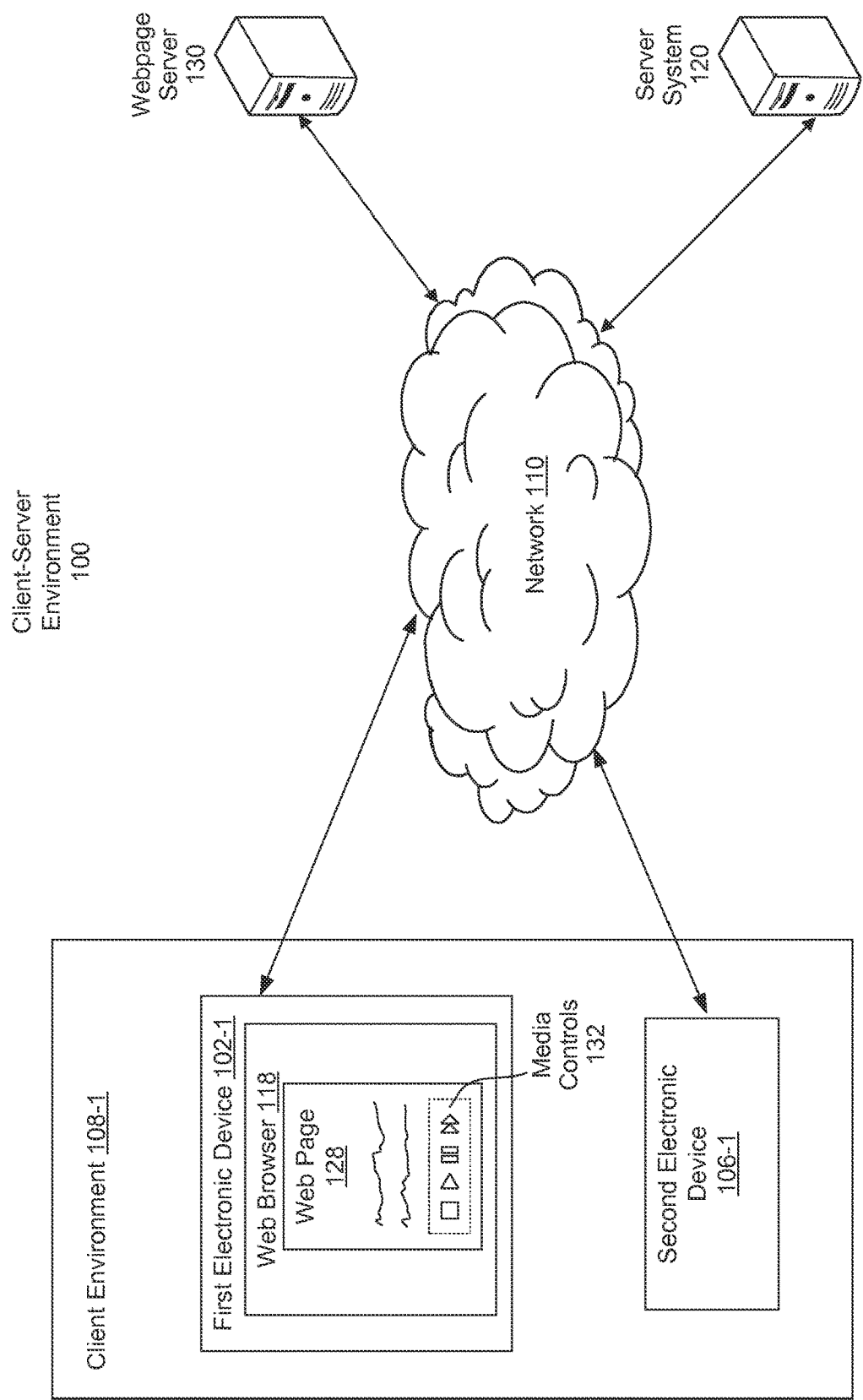
FIG. 1B is a block diagram illustrating a client-server environment, according to some implementations.

FIG. 1B is a block diagram illustrating a client-server environment 100 in accordance with some implementations. The client-server environment 100 includes a client environment 108-1, a server system 120, and a webpage server 130 that are connected through a network 110. In some implementations, the client environment 108-1 includes one or more electronic devices (102-1, 106-1) within the client environment 108-1. The network 110 includes any of a variety of networks, including wide area networks (WAN), wireless networks, wired networks, virtual private networks (VPNs), the Internet, or a combination of such networks. FIG. 1B illustrates, for example, an environment in which a user may initiate presentation of media content using controls on a webpage displayed at a laptop or desktop computer, and have the media content presented on a different device (e.g., a smart phone).

In some implementations, the client environment includes a first electronic device 102 and a second electronic device 106. The first electronic device 102 includes a web browser 118 (e.g., a computer application configured to access and/or present web-based content, including web pages, on a user interface device associated with a computer). In some implementations, the web browser 118 displays a web page 128 received from the webpage server 130. In some implementations, the webpage server 130 is distinct from (e.g., associated with a different source or service provider) than the server system 120. The webpage includes media controls 132 that allow a user to initiate presentation of second media content. For example, a webpage of a social networking service may allow users to post about media content. These posts may include control elements, such as a "play" button, that another user may select in order to playback the media content that was recommended or commented on by their social contact.

In some implementations, when the user selects an initiation control included in the webpage (e.g., a "play" button), the first electronic device determines whether a media presentation application associated with the user is currently presenting media content (e.g., playing back a song, video, etc.). In accordance with a determination that the media presentation application is currently presenting media content, the presentation of the media content is interrupted, and the second media content selected by the user is started. In other implementations, the second media is added to the end of the current playlist or placed as the next media content to be played once the current media content ends. In some implementations, the second media is included in a set of media content that is available to a pseudo-random selection routine (e.g., a "shuffle" mode of a device).

In some implementations, the media controls 132 include device selection tools that allow a user to choose, from a list of available electronic devices, a specific device which will present the second media content. In some implementations, in accordance with user selection of a specific device, the selected electronic device begins presenting the second media content. For example, when the user is browsing a social networking website, blog, or the like, the user may come across a post that includes a playback control. When selected, the playback control may present a menu including a list of electronic devices to which the user may stream the media content associated with the post. For example, a dropdown menu may appear offering the user options such as "Play at iPhone," "Play at Living Room Stereo," "Play Here," and/or "Play on Tablet PC." The user may then select the preferred device, and the server system 120 will cause the media to be presented via that device. In some implementations, the menu only includes those devices that are currently available to present media (e.g., those that are currently "online" and/or logged in to the same account associated with the viewer of the webpage). In some implementations, when the selected electronic device is already presenting a media content item, presentation of that media content item ceases when the user selects the second media content.

Figure 2:
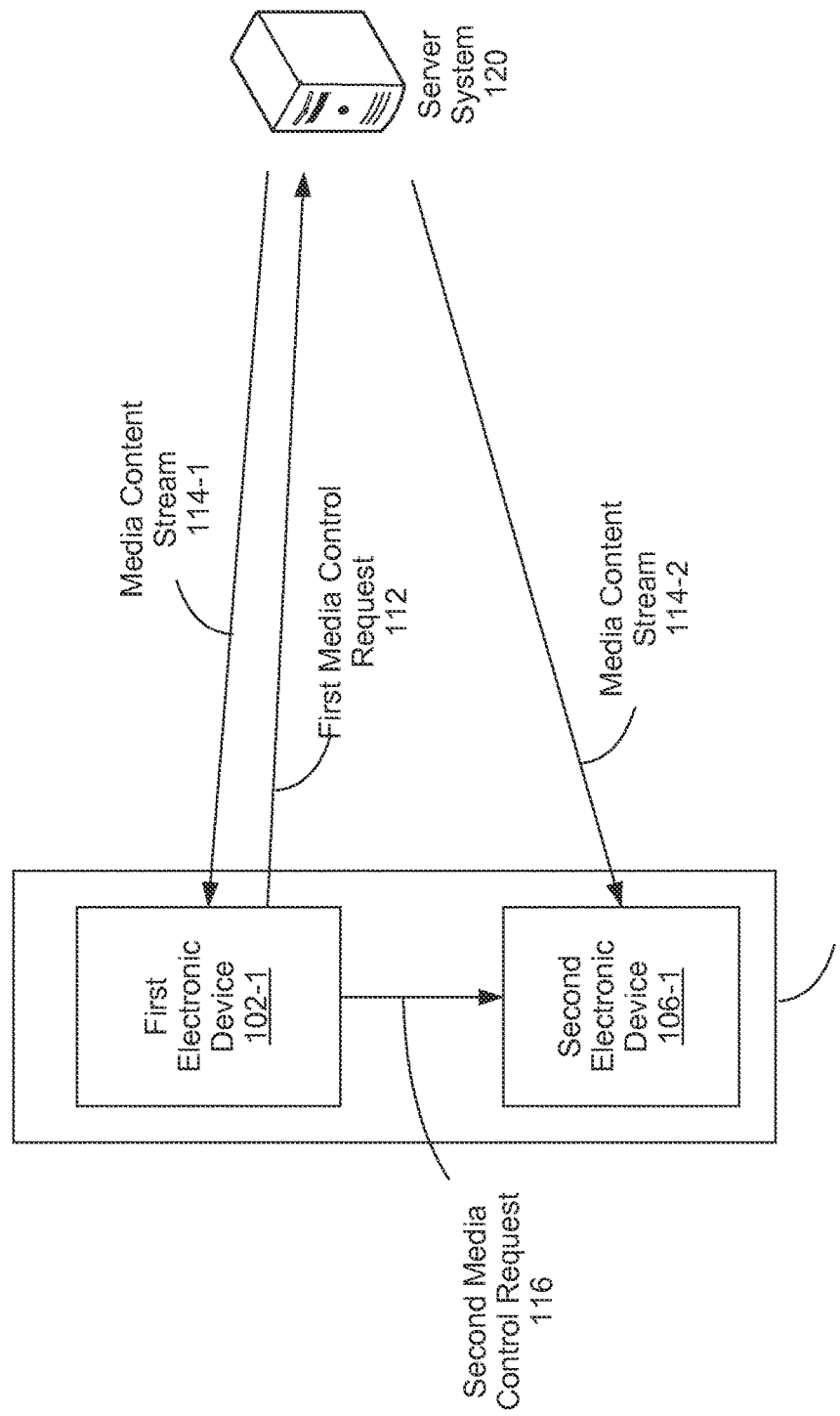
FIG. 2 is a block diagram illustrating a client-server environment, in accordance with some implementations.

FIG. 2 is a block diagram illustrating a client-server environment 100 in accordance with some implementations. The client-server environment 100 includes a local area network 202 that connects at least a first electronic device 102-1 and a second electronic device 106-1. A server system 120 is located remotely from the local area network 202 and is not integrated into the local area network 202. In some implementations, the server system 120 stores media content and streams the stored media content to remote electronic devices upon request.

In some implementations, the server system 120 streams a media content stream 114-1 to the first electronic device 102-1. The media content stream includes the data necessary to present the desired media content at the first electronic device 102-1, context for the presented media content, and other optional information, such as user account information or advertisements. The user of the first electronic device uses an application running on the first electronic device 102-1 to send a first media control request 112 to the server system. First media control requests 112 include information identifying a second electronic device to which the server system should begin sending the media content stream and information identifying the media content that is to be presented by the identified second electronic device 106-1.

In some implementations, the first electronic device 102-1 also sends a corresponding second media control request 116 to the second electronic device 106-1 at substantially the same time as the first media control request 112. The second media control request 116 includes a notification that the first electronic device 102 has requested that the server system 120 begin streaming content media to the second electronic device 106-1 and information identifying specific media content to be presented by the second electronic device 106-1. Sending a second media control request 116 to the second electronic device 106-1 over a local area network in addition to sending the first media control request over the internet to the server system 120 allows for two separate, redundant pathways to initiate media presentation by the second electronic device 106-1. This allows the second device to react more quickly and more reliably to the media control request of the first electronic device 102-1. For example, if the first electronic device 102-1 has limited or no connection to the Internet, or limited or no connection with the second device over the local area network, the media control request can still be delivered to the second electronic device 106-1.

In some implementations, the second electronic device 106-1 includes an application for media presentation. In some implementations, both the first electronic device 102-1 and the second electronic device 106-1 are running copies of the same media presentation application (or media presentation applications that are associated with the same streaming service). In some implementations, both the first electronic device 102-1 and the second electronic device 106-1 are connected to the same user account (or associated user accounts) on the server system 120.

In some implementations, the second electronic device 106-1 buffers/caches a portion of the content that is being streamed to the first electronic device 102-1, in case the user should choose to begin media presentation by the second device instead of or in addition to the first device. Thus, when the second media control request 116 is received by the second electronic device 106-1 over the local area network 202, the second electronic device 106-1 begins presenting the desired media content from the buffer/cache even before the media content stream 114-2 is fully initiated and received from the server system 120. In this way, the transfer of the media content stream from the first electronic device 102-1 to the second electronic device 106-1 occurs more quickly and more reliably than would be possible without the second media control request.

In some implementations, the buffering/caching described above is active whenever the media presentation application is active (e.g., currently running or being executed, either as a foreground or a background process) on the second electronic device 106-1. In some implementations, the second electronic device 106-1 caches/buffers a predetermined portion of the media content that is being streamed to the first electronic device 102-1, such as the next 10 seconds, 20 seconds, 30 seconds, 1 minute, etc. In some implementations, the second electronic device 106 receives the current media playback location from the first electronic device 102-1 and/or the server system 120, such that when the second electronic device 106-1 receives a command to begin presenting the media content, it begins presentation by the same position as the first electronic device 102-1.

Figure 3:
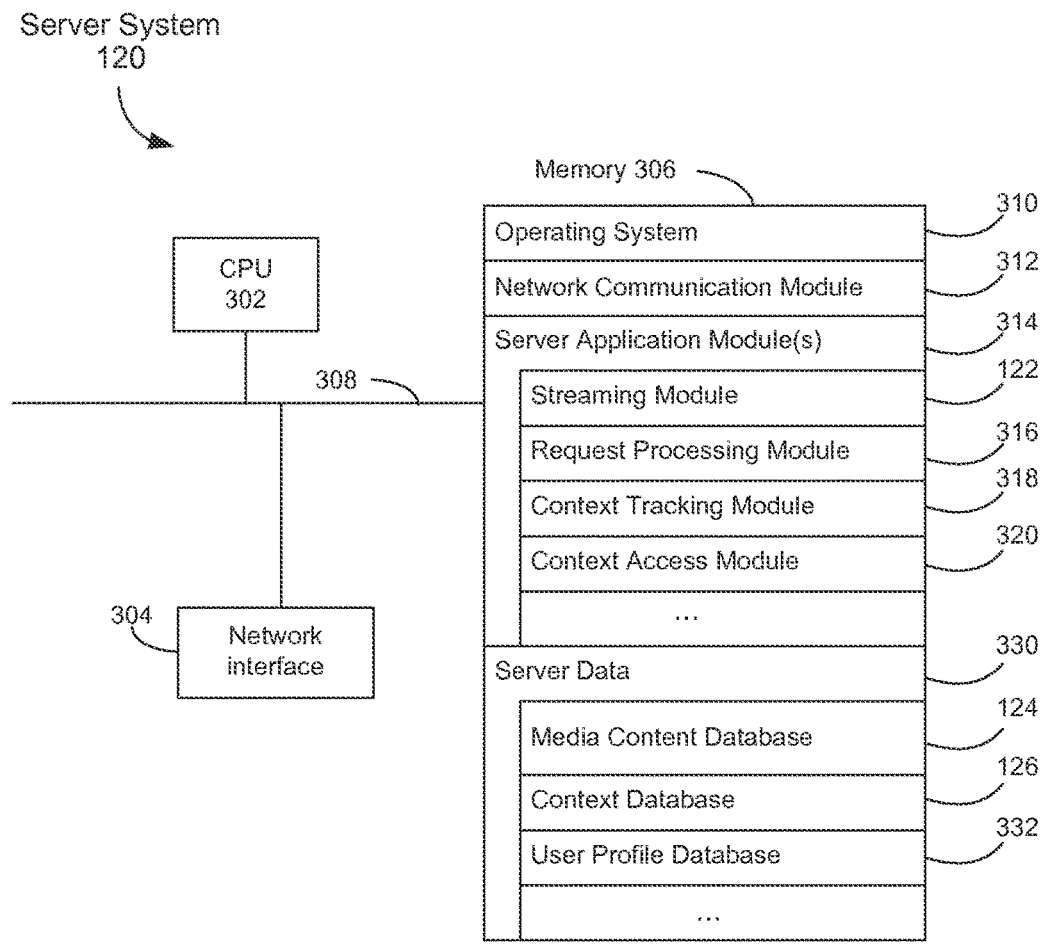
FIG. 3 is a block diagram illustrating a server system, in accordance with some implementations.

FIG. 3 is a block diagram illustrating a server system 120, in accordance with some implementations. The server system 120 typically includes one or more processing units (CPU's) 302, one or more network interfaces 304, memory 306, and one or more communication buses 308 for interconnecting these components.

Memory 306 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, includes a non-transitory computer readable storage medium. In some implementations, memory 306 or the computer readable storage medium of memory 306 stores the following programs, modules and data structures, or a subset thereof:

- an operating system 310 that includes procedures for handling various basic system services and for performing hardware dependent tasks;
- a network communication module 312 that is used for connecting the server system 120 to other computers via the one or more communication network interfaces 304 (wired or wireless) and one or more communication networks, such as the Internet, other wide area networks, local area networks, metropolitan area networks, VPNs, and so on;
- one or more server application module(s) 314 for enabling the server system 120 to perform the functions offered by the server system 120, including but not limited to:
    - a media streaming module 122 for streaming media content to an electronic device (e.g., first or second electronic devices 102-1, 106-1) remote from the server system 120;
    - a request processing module 316 for receiving requests from electronic devices (e.g., first or second electronic devices 102-1, 106-1), wherein the requests include requests to stream specific media content to the electronic devices and/or requests to change the destination of the media content stream from a first electronic device (e.g., first electronic device 102-1) to a second electronic device (e.g., second electronic device 106-1);
    - a context tracking module 318 for tracking and storing the context of a media content stream, including storing, among other data, the current playback position in a media content stream that is currently being presented by an electronic device (e.g., first or second electronic devices 102-1, 106-1), the position in a current playlist, the play history of a user, the preferences of a user, previously skipped media content, and whether media content items were "liked" or "disliked" (e.g., via "starred," "thumbs-up," and/or "thumbs-down" indications);

a context access module 320 for allowing electronic devices (e.g., first or second electronic devices 102-1, 106-1) associated with a given user account to access the current context for media content streams (e.g., media content streams 114-1, 114-2) associated with the given user account; and one or more server data module(s) 330 for storing data related to the server system 120, including but not limited to:

media content database 124 including a library of media content and the data needed to present that media on various electronic devices (e.g., first or second electronic devices 102-1, 106-1);

a context database 126 including information associated with one or more media content streams, wherein context information includes the current playback position in a media content stream, a position in a playlist, play history of a user, user preferences, skipped media, and user settings; and a user profile database 332 including account information for a plurality of users, each account including user media histories, user preferences, and determined user interests.

Figure 4:
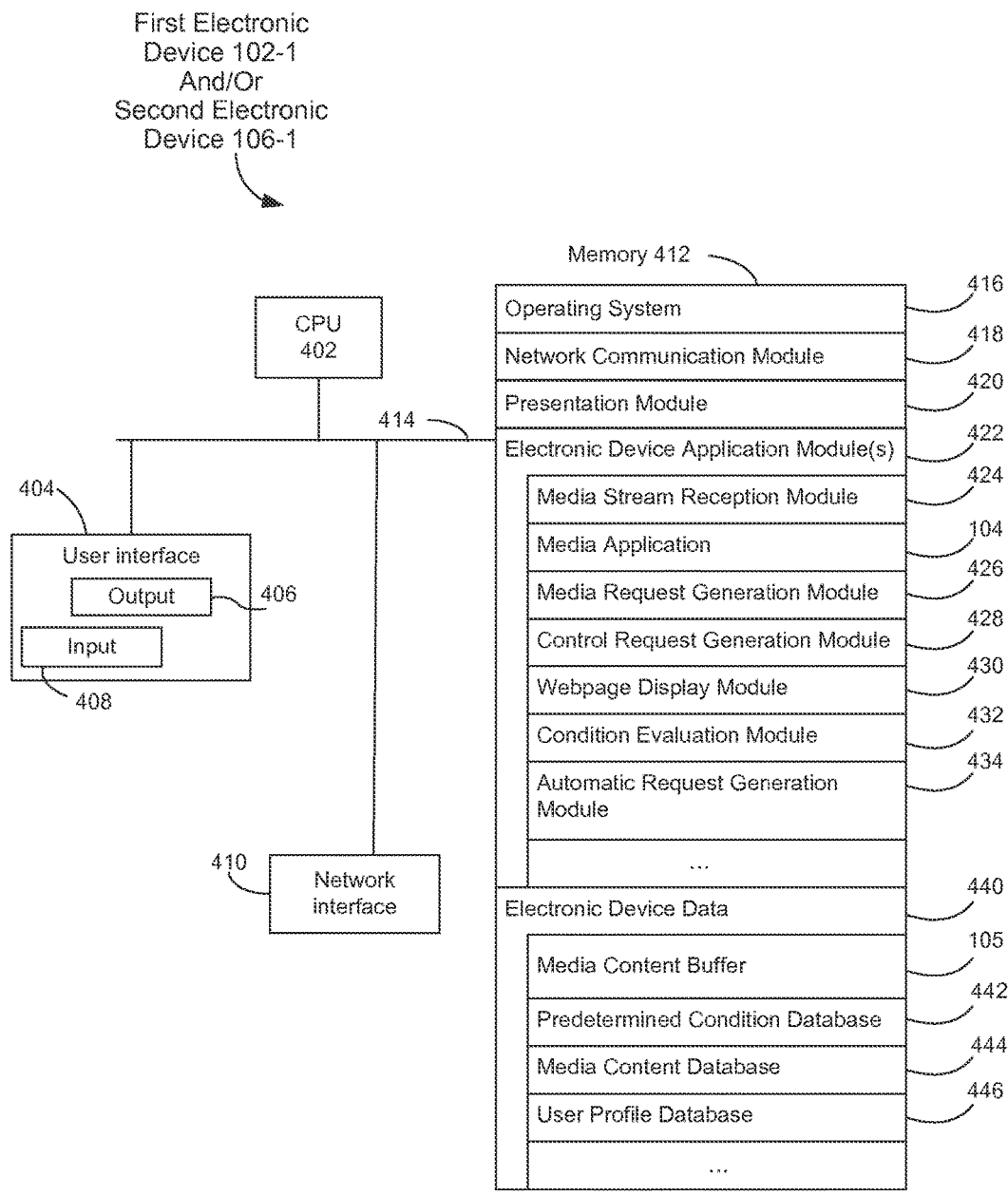
FIG. 4 is a block diagram illustrating an electronic device, in accordance with some implementations.

FIG. 4 is a block diagram illustrating a first electronic device 102-1 and/or a second electronic device 106-1, in accordance with some implementations. The client system 102 typically includes one or more processing units (CPU's) 402, one or more network interfaces 410, memory 412, and one or more communication buses 414 for interconnecting these components. The client system 102 includes a user interface 404. The user interface 404 includes user interface elements that enable output 406 to be presented to a user, including speakers or a visual display. The user interface 404 includes user interface components that facilitate user input 408 such as a keyboard, a mouse, a touch sensitive display, or other input buttons 408.

Memory 412 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 412 may optionally include one or more storage devices remotely located from the CPU(s) 402. Memory 412, or alternately the non-volatile memory device(s) within memory 412, includes a non-transitory computer readable storage medium. In some implementations, memory 412 or the computer readable storage medium of memory 412 stores the following programs, modules and data structures, or a subset thereof:

an operating system 416 that includes procedures for handling various basic system services and for performing hardware dependent tasks;

a network communication module 418 that is used for connecting the first electronic device 102-1 and/or the second electronic device 106-1 to other computers via the one or more communication network interfaces 410 (wired or wireless) and one or more communication networks, such as the Internet, other wide area networks, local area networks, metropolitan area networks, VPNs, and so on;

a presentation module 420 for enabling presentation of media content at the first electronic device 102-1 and/or the second electronic device 106-1 through the output mechanisms 406 associated with the user interface 404;

one or more client system application module(s) 422 for enabling the first electronic device 102-1 and/or the second electronic device 106-1 to perform one or more functions described herein, including but not limited to:

a media stream reception module 424 for receiving a media content stream (e.g., FIG. 1A, 114) from a server system (e.g., FIG. 1A, 120), the media content stream including data needed to present media content at the first electronic device 102-1 and/or the second electronic device 106-1 and context data for the media content stream, wherein the media content stream can include a variety of media types including, but not limited to, audio media such as music, radio, audio books, and podcasts; video media such as internet videos, television programming, and movies; and any other type of digitally transmissible media (e.g., games, images, advertisements, etc.);

a media presentation and control application 104 for presenting media content by the first electronic device 102-1 and/or the second electronic device 106-1, for controlling media presentation by other electronic devices, and for interacting with the server system 120;

a media request generation module 426 for, in response to user input requesting presentation of particular media content, generating a request for transmission to the server system 120 for the requested media to be streamed to the first electronic device 102-1 and/or the second electronic device 106-1;

a control request generation module 428 for, in response to user input requesting control of media presentation by a second electronic device (e.g., FIG. 1A, 106), generating a first request for transmission to the server system (e.g., FIG. 1A, 120) and a second media control request for transmission to the second electronic device (e.g., FIG. 1A, 106) via a local area network, VPN, Bluetooth, etc.(e.g., FIG. 2, 202);

a webpage display module 430 (including, e.g., the web browser 118, FIG. 1B) for displaying a webpage published by a third party;

a condition evaluation module 432 for determining whether a predetermined condition is met; in some implementations, the condition evaluation module 432 periodically determines whether any predetermined condition has been met; and an automatic request generation module 434 for, in response to a determination by the condition evaluation module 432 that a predetermined condition is met, generating a request for transmission to the server system (e.g., the server system 120) without any direct user input;

an electronic device data module 440 for storing data related to the first electronic device 102-1 and/or the second electronic device 106-1, including but not limited to:

media content buffer 105 including media content data received from a stream from the server system (e.g., FIG. 1A, 120) and stored in the memory of the first electronic device 102-1 and/or the second electronic device 106-1;

predetermined condition database 442 including, but not limited to, one or more predetermined conditions, established by the user of the electronic device 102, that determine whether a media control request to change the destination of the media content stream should be automatically generated;

media content database 444 for storing, on the local device, media content that is part of the user's personal library of media content; and a user profile database 446 including account information for a specific user of the first electronic device 102-1 and/or the second electronic device 106-1, including user media history, user preferences, and determined user interests.

Figure 5:
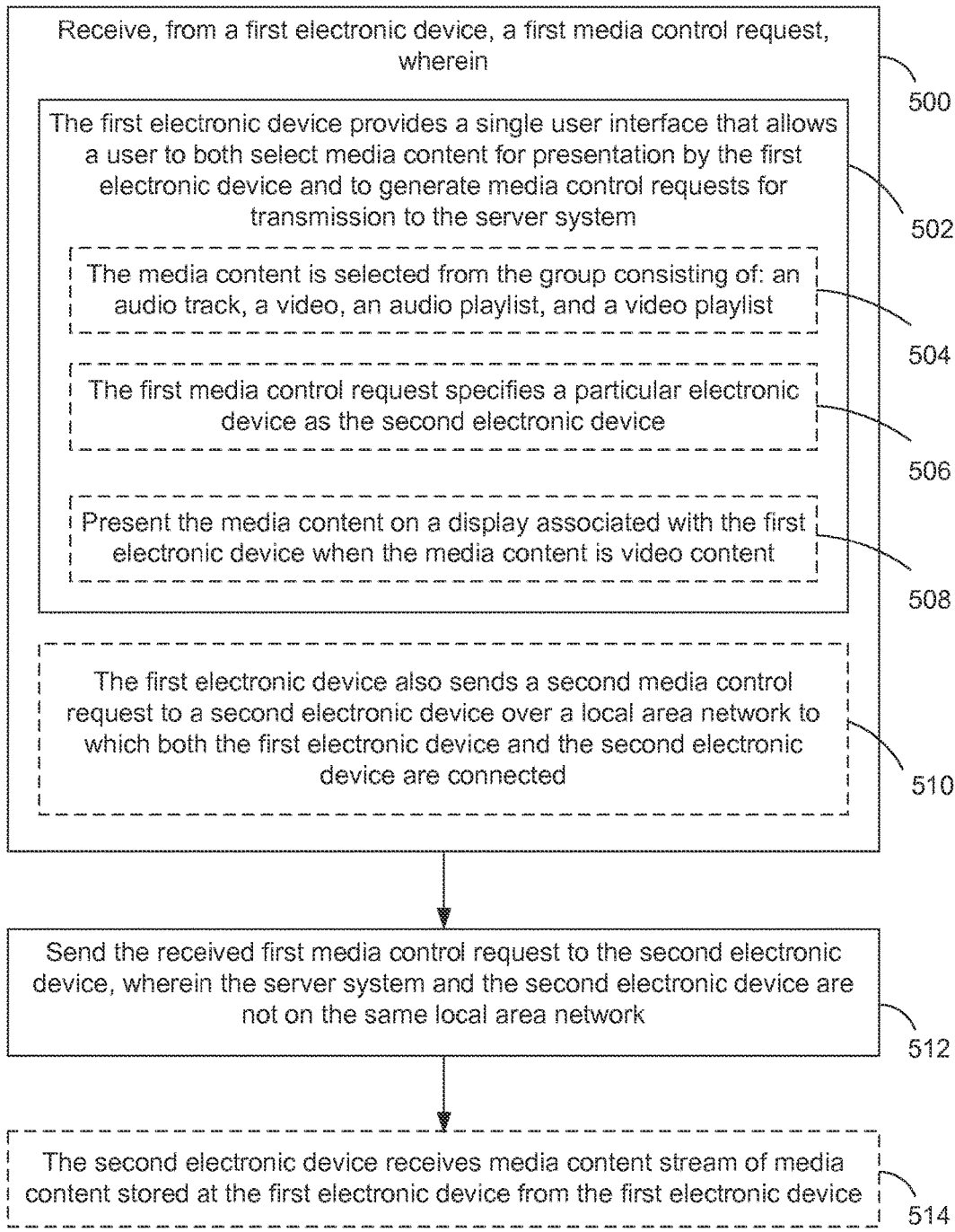
FIG. 5 is a flow diagram illustrating a process of remotely controlling an electronic device, in accordance with some implementations.

FIG. 5 is a flow diagram illustrating the process of remotely controlling an electronic device in accordance with some implementations. Each of the operations shown in FIG. 5 may correspond to instructions stored in a computer memory or computer readable storage medium. In some implementations, the method described in FIG. 5 is performed by an electronic device (e.g., the first or second electronic devices 102-1, 106-1; the server system 120). The following discussion describes the method(s) as being performed by a server system (e.g., the server system 120). However, it will be understood that the method(s) described may be performed by any other appropriate device or combination of devices, including client and/or server devices.

In accordance with some implementations, the server system receives a first media control request from a first electronic device (e.g., the first electronic device 102-1) (500). The first media control request includes information designating a second electronic device (e.g., the second electronic device 106-1) and specific media content to be presented by the second electronic device. For example, a control request received at the server system from a mobile phone includes information that designates a laptop computer and the song "Jessie's Girl." (As noted above, control requests, in some implementations, include commands to pause, skip, fast-forward, rewind adjust volume, change the order of items in a playlist, add or remove items from a playlist, adjust audio equalizer settings, change or set user settings or preferences, and the like).

In some implementations, the first electronic device executes a media application that provides a single user interface to both select media content for presentation by the first electronic device and to generate media control requests for transmission to the server system (502). Thus, for example, a user is able to easily select music to be played by a mobile device and, in the same application and with the same interface, generate both first and second media control requests for a second electronic device without having to switch applications or interfaces.

In some implementations, the media content includes, but is not limited to, audio tracks, videos, movies, audio playlists, video playlists, and/or a radio stream (504). The audio tracks can be a variety of audio-based digital media such as songs, podcasts, radio shows, and/or audio books.

In some implementations, the first media control request includes information specifying a particular electronic device from a group of available electronic devices to be controlled as the second electronic device (506).

In accordance with some implementations, the media content is video content. In this case, the video content is presented on a display associated with the first electronic device (508).

In some implementations, the first electronic device also sends a second media control request to a second electronic device over a local area network or VPN to which both the first electronic device and the second electronic device are connected (510). Sending both a first media control request and a second media control request increases the speed with which the second electronic device responds to the request, and the reliability of the request being received. In some implementations, the second electronic device has already buffered some of the requested media content and can therefore begin presenting that content before receiving content from a media content stream from the server system. The second media control request is sent over any communication type that allows peer-to-peer communication between the two electronic devices without having to leave the local area network/VPN. In some implementations, the second media control request is sent via WiFi, BLUETOOTH, or the like.

In some implementations, the server system sends the received first media control request to the second electronic device, distinct from the first electronic device, wherein the server system and the second electronic device are not on the same local area network/VPN (512). In some implementations, the server system also begins streaming media content to the second electronic device upon receipt of the first media control request.

In some implementations, the second electronic device receives a stream of media content from the first electronic device, where the media content is stored on the first electronic device (514). In this way, content that is part of a user's personal library and is stored on the first electronic device can be streamed to another device. Thus, for example, a user can use a smart phone to cause a home stereo system to begin streaming music from a remote server (e.g., associated with a media content provider), and may also stream locally stored music from the smart phone to the home stereo system via local communication paths, regardless of whether that music is available from the media content provider. Accordingly, media that is stored on one device may be accessible to another device seamlessly and without having to download, transfer, or otherwise duplicate the media content on multiple devices. Also, this process may be seamless to the user, such that the same controls and inputs are used both for causing a second device to stream media from a remote source, and for causing locally stored media to be streamed to the second device via local communication paths.

For example, if a user has downloaded "Stairway to Heaven" onto her smartphone, this song may appear in a playlist on the smartphone. This playlist can include media content that is stored locally (e.g., "Stairway to Heaven") as well as media content that must be streamed from a remote source. However, if the user were to request, via her smart phone, that the playlist be played back on a home audio system that can receive streaming media from the remote source, "Stairway to Heaven" would not be able to be played back, as it was only ever stored on the smart phone. Thus, in accordance with the disclosed implementation, the locally stored media may be streamed to the second device (e.g., the home stereo) when its turn in the playlist arrives. Accordingly, the user need not worry about where any given media content item is stored, because the media may be streamed from either remote or local sources.

Figure 6:
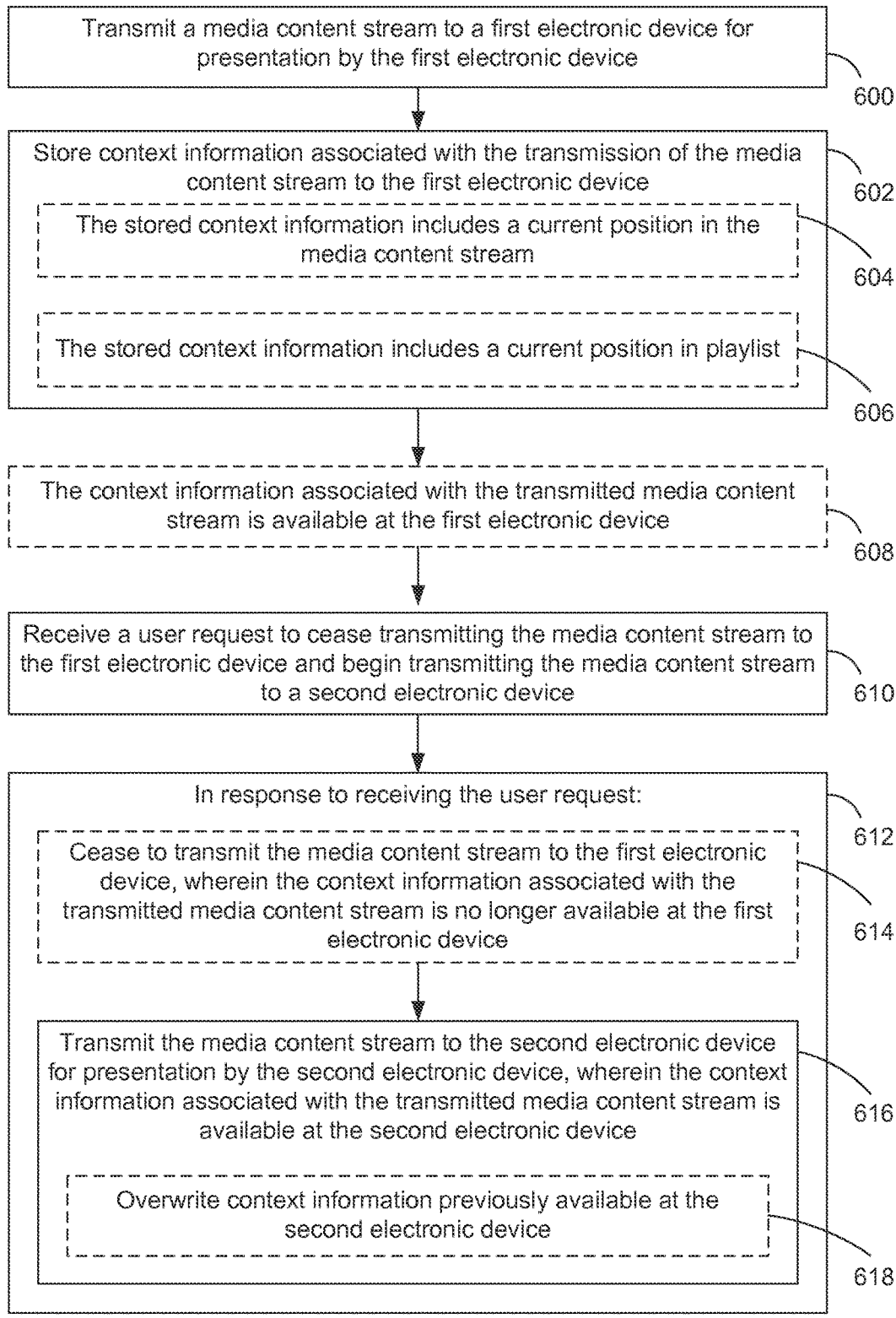
FIG. 6 is a flow diagram illustrating a process of making a media player context available at a second electronic device in response to beginning to stream media content to the second electronic device, in accordance with some implementations.

FIG. 6 is a flow diagram illustrating a process of making a media player context available at a second electronic when streaming media content to the second electronic device, in accordance with some implementations. Each of the operations shown in FIG. 6 may correspond to instructions stored in a computer memory or computer readable storage medium. In some implementations, the method described in FIG. 6 is performed by an electronic device (e.g., the first or second electronic devices 102-1, 106-1; the server system 120). The following discussion describes the method(s) as being performed by a server system (e.g., the server system 120). However, it will be understood that the method(s) described may be performed by any other appropriate device or combination of devices, including client and/or server devices.

In accordance with some implementations, the server system transmits a media content stream to a first electronic device (e.g., the first electronic device 102-1) (600). The media content stream may include, but is not limited to, one or more audio tracks or playlists or a radio or television stream.

The server system stores context information associated with the transmission of the media content stream to the first electronic device (602). In some implementations, the stored context information is a current position in the media content stream (604). For example, the stored context information includes the specific playback location of a song or movie being presented by the first electronic device. Thus, the server system is able to resume presentation of that media stream at the same position, should the stream be interrupted, paused, or transferred. In some implementations, the stored context information also includes the current position in a playlist (606), previously played songs, user settings such as volume and genre of media to be streamed, user preferences based on information stored in a profile, and/or any other information pertinent to the media content stream.

In some implementations, the context information associated with the transmitted media content stream is available at the first electronic device. Thus, the user of a first electronic device can view the context (e.g. playlist, history, position in a song/video/etc.) for the media content stream.

In some implementations, the server system receives a user request to cease transmitting the media content stream to the first electronic device and begin transmitting the media content stream to a second electronic device (e.g., the second electronic device 106-1) (610). This request is generated in response to user input at the first electronic device, and represents, for example, the user wishing to switch to a new device while still continuing to have access to the context information associated with the media content stream.

In some implementations, in response to the received user request (612), the server system ceases to transmit the media content stream to the first electronic device, wherein the context information associated with the transmitted media content stream is no longer available at the first electronic device (614). By making the context of a content media stream no longer available at the first electronic device, the user ensures that the server system no longer streams any data to the device. This is particularly advantageous on a mobile device where battery life, bandwidth, and data transfer may be limited or expensive. In this way, the user prevents the first electronic device from using battery power, bandwidth, and computing resources to continue streaming context information from the server system when it is no longer desired. This is especially useful for smart phone users who pay for data based on the amount used by the user.

In some implementations, the server system transmits the media content stream to the second electronic device for presentation by the second electronic device, wherein the context information associated with the transmitted media content stream is available at the second electronic device (616). In this way the media stream being presented on the first device is seamlessly transferred to a new device while maintaining the same state as on the first device. Thus, users may easily switch between devices without fear of losing their place in a song, a movie, a playlist, etc. In some implementations, the context information that was previously available at the second electronic device is overwritten (618).

In some implementations, electronic devices in a client environment (e.g., first or second electronic devices 102-n, 106-n, in client environment 108-n) provide controls (e.g., hardware buttons, touch-screens, gesture recognition systems, voice recognition systems, etc.) that allow users to control the presentation of media content at that device and/or other devices. For example, a standalone wireless speaker, home audio/visual system, television, or the like may provide a set of controls such as "play," "pause," "skip forward," "skip back," "volume up," "volume down," etc. In some implementations, selecting a control (e.g., at a first electronic device) causes a media control request to be sent from the first electronic device to one or more other devices, such as second electronic devices 106-n, first electronic devices 102-n, remote servers, etc.

In some implementations, the media control request is sent to the server system 120, which then sends control requests, media context information, media content (e.g., streaming or otherwise), etc., to other devices. In some implementations, such information is shared with and/or sent to devices that are associated with a common user account or that are otherwise linked to or associated with one another. For example, a client environment 108-1 may include several electronic devices that are in communication with each other, the server system 120, or both. One specific example is a home that includes several wireless speakers that can each access media content stored at a first electronic device 102-1 and/or the server system 120.

When several such electronic devices are associated with one another as described above, a user selection of a control on one device may cause various actions to occur on that device and/or on the other devices. Moreover, the action that is caused by a selection of a control may depend on the state of other electronic devices that are associated with the user and/or are within the client environment 108-1. Accordingly, an integrated and intuitive system may be provided whereby users can control a media environment via controls at one device. Various exemplary types of control selections and resultant media control actions are discussed below. In various implementations, other control selections may cause the described actions, and other actions (or combinations of actions) may be performed in response to a given control selection. For example, actions that occur in response to a selection of a "play" control may likewise occur in response to a selection of another control, or in response to a different type of selection of the "play" control (e.g., a momentary selection versus a maintained selection.) Moreover, the following examples relate to the presentation and control of music, but they also apply to the presentation and/or control of other types (e.g., movies, television shows, podcasts, audiobooks, etc.).

In some implementations, a user selection of a "play" control at a given electronic device will cause one or more of the following action(s) and/or event(s) to occur:

If no music is currently playing on any of the electronic devices associated with a user (e.g., the music was previously stopped, paused, etc.), music will begin playing at the given electronic device. In some implementations, the electronic device will communicate with a remote server (e.g., server system 120) or other associated electronic devices in order to identify what music is being played by the other electronic devices (among other possible information), or what music was previously paused by the user. If music was previously paused, the music is played back on the first electronic device from the pause point, regardless of what device was playing the music last. For example, when a user presses a "play" button on a set of speakers in the living room, that set of speakers will begin to play the same song that was previously paused at the speakers in the user's bedroom. In some implementations, other context of the paused song (e.g. the playlist that the song is in, play history, etc.) is maintained. If there is no paused music associated with the user or the devices, then other music may be played back (e.g., a default song, other songs in the user's playlists or play history, a radio station, a sponsored playlist, etc.).

If music is currently playing on one of the other electronic devices associated with a user, the music will stop playing on that device and begin playing at the electronic device at which the "play" control was selected. In some implementations, this occurs in response to a momentary selection of a "play" button or other control. In some implementations, a momentary selection is a tap or a short press of a button or control, such as less than 1 second, less than 2 seconds, less than 3 seconds, etc.

If music is currently playing on one of the other electronic devices associated with a user, the music will begin playing at the electronic device at which the "play" control was selected, in addition to the active playback at the other electronic devices. In some implementations, the music is synchronized or substantially synchronized between all of the devices that are playing back the music. (Even if not exactly synchronized, playback may be synchronized between devices to such an extent that any differences in playback positions are imperceptible to the user, or otherwise do not detract significantly from the listening experience.) Thus, if a user is listening to music in a bedroom, and moves to a living room, the user may initiate synchronized playback of the music currently playing in the bedroom by pressing and holding a "play" control on the living room speakers. In some implementations, this occurs in response to a maintained selection of a "play" button or other control. In some implementations, a maintained selection is a press of a button or control that lasts more than 1 second, more than 2 seconds, more than 3 seconds, or any other appropriate time.

In some implementations, a user selection of a "skip" control (e.g., skip-forward or skip-backward) at a given electronic device will cause the next or previous song in a playlist, album, queue, etc. to be played back. In some implementations, the "skip" command only affects the device where the selection occurred. In some implementations, it affects all devices that are simultaneously or substantially simultaneously playing back the music. In some implementations, the result of selecting a "skip" control depends on whether the selection was a momentary selection (e.g., less than 1, 2, or 3 seconds, or any other appropriate duration) or a maintained selection (e.g., more than 1, 2, or 3 seconds, or any other appropriate duration).

In some implementations, a user selection of a "pause" control at a given electronic device will cause the playback to be paused. In some implementations, the "pause" command only affects the device where the selection occurred. In some implementations, it affects all devices that are simultaneously or substantially simultaneously playing back the music. In some implementations, the result of selecting a "pause" control depends on whether the selection was a momentary selection (e.g., less than 1, 2, or 3 seconds, or any other appropriate duration) or a maintained selection (e.g., more than 1, 2, or 3 seconds, or any other appropriate duration).

In some implementations, a user selection of a "radio" control (e.g., a button, touchscreen element, gesture input, etc.) at a given electronic device will cause one or more of the following action(s) and/or event(s) to occur:

If no music is currently playing on any of the electronic devices associated with a user, a radio station will begin playing at the given electronic device. In some implementations, the radio station is a default, a favorite, or a most-listened-to radio station. The radio station may be received via a traditional over-the-air broadcast signal, via a network (e.g., the Internet), or any other appropriate communication channel. In some implementations, the radio station corresponds to a playlist or queue of songs that have a common theme (e.g., a common genre, artist, mood, sound, tempo, key, etc.), and may be initialized by selecting a "seed" song, artist, genre, etc. This may be referred to as a "seeded" radio station.

If music is currently playing on the given electronic device, or another electronic device associated with the user, a "seeded" radio station is initiated based on that song and played back. In some implementations, the currently played song is stopped and the "seeded" radio station is played back in its place. In some implementations, the currently played song is allowed to finish before the "seeded" radio station begins playback. Thus, for example, when a user selects a "radio" control during playback of the song "Killer Queen," a seeded radio station based on that song is initiated, retrieved, and/or identified, and played back once the seed song ends, or once the seed song is stopped prior to its end.

In some implementations, the result of selecting a "radio" control depends on whether the selection was a momentary selection (e.g., less than 1, 2, or 3 seconds, or any other appropriate duration) or a maintained selection (e.g., more than 1, 2, or 3 seconds, or any other appropriate duration).

In any of the implementations described herein, if a playlist or other queue of media content is selected for presentation, other media content may be presented to the user once the playlist or queue ends. In some implementations, the media content that is selected for presentation after a playlist or queue ends is a "seeded" radio station, and is based on the content of the playlist or queue that just finished. For example, the seeded radio station may be based on the last song in the previous playlist, the most common genre represented in the previous playlist, the most common artist represented in the previous playlist, the "average genre" of the previous playlist, and the like. In some implementations the average genre of the previous playlist is configured so that songs that are "disliked" (e.g., with a dislike button) or skipped do not factor in to the average genre (or they are given less weight than other songs). In some implementations, songs that are "liked" (e.g., with a "like" button) or that are replayed are given more weight than other songs.

Figure 7:
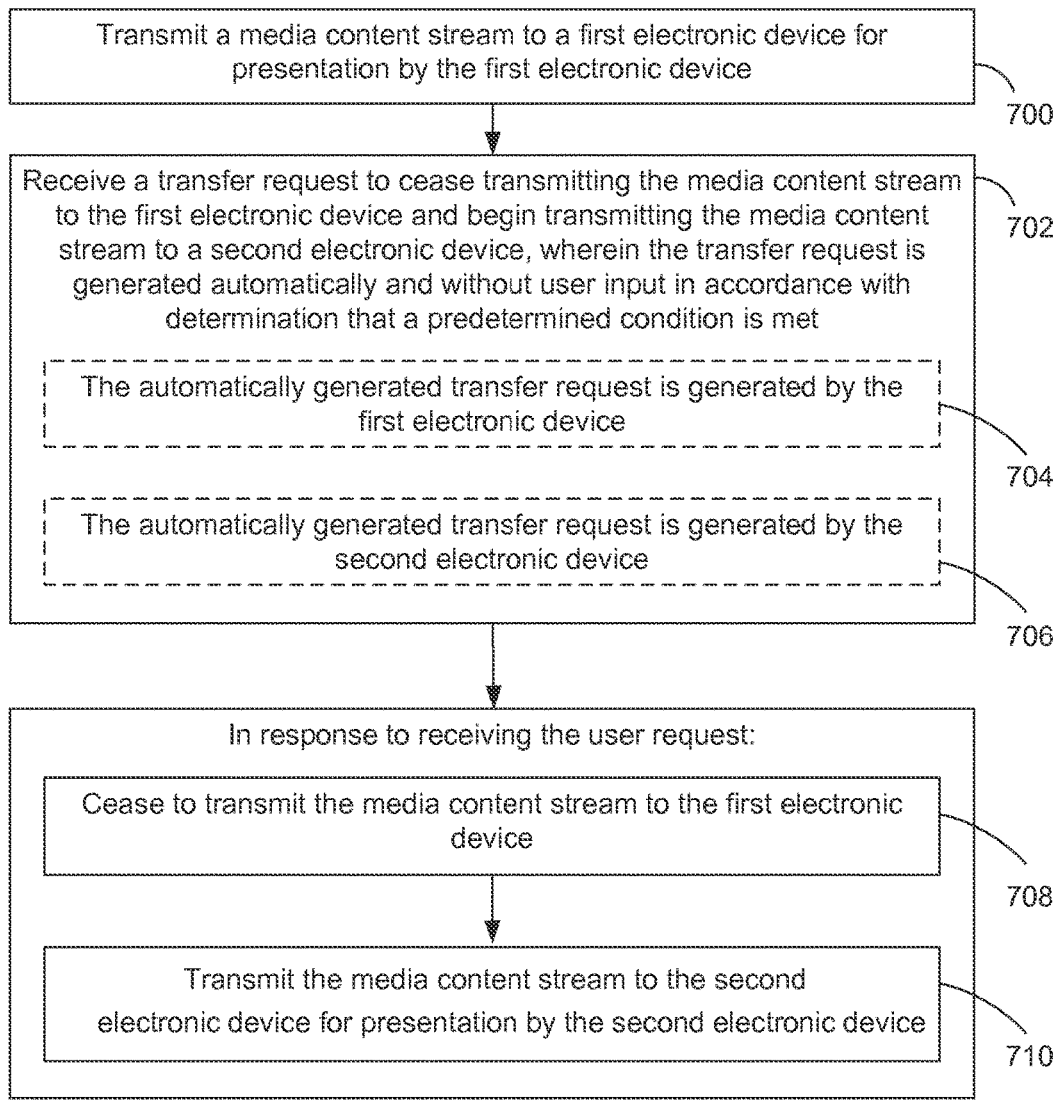
FIG. 7 is a flow diagram illustrating a process of automatically transferring a media content data stream, in accordance with some implementations.

FIG. 7 is a flow diagram illustrating a process of transferring a media content data stream, in accordance with some implementations. Each of the operations shown in FIG. 7 may correspond to instructions stored in a computer memory or computer readable storage medium. In some implementations, the method described in FIG. 7 is performed by an electronic device (e.g., the first or second electronic devices 102-1, 106-1; the server system 120). The following discussion describes the method(s) as being performed by a server system (e.g., the server system 120). However, it will be understood that the method(s) described may be performed by any other appropriate device or combination of devices, including client and/or server devices.

In accordance with some implementations, the server system transmits a media content stream to a first electronic device (e.g., the first electronic device 102-1) for presentation by the first electronic device (700). The server system then receives a transfer request to cease transmitting the media content stream to the first electronic device and begin transmitting the media content stream to a second electronic device (e.g., the second electronic device 106-1), wherein the transfer request is generated without user input in accordance with a determination that a predetermined condition is met (702). In some implementations, the predetermined condition is determined by the user of the electronic device, prior to determining that it has been met. In some implementations, determining that the predetermined condition is met includes detecting through a GPS locator that the device has moved into or out of a specific location. In some implementations, the location of the device is determined using cell-tower triangulation. In some implementations, the predetermined condition includes detecting a signal from a wireless network, a GPS locator, or from another device.

One example of a predetermined condition is whether two electronic devices are in close proximity to one another. In some implementations, this condition is determined by determining whether a strength of a wireless signal between the first electronic device and the second electronic device is above or below a predetermined threshold.

Another example of a predetermined condition is whether two devices are in communication with one another (e.g., indicating that a user has returned to or entered a certain area). In some implementations, this condition is determined by determining whether a communication connection between the first electronic device and the second electronic device has been established (e.g., via WiFi, BLUETOOTH, or any other wired or wireless connection components, protocols, and/or techniques). This may occur, for example, when a user returns home, and a communication connection is automatically established between a home audio system and the user's smartphone.

Another example of a predetermined condition is whether two devices are no longer in communication with one another (e.g., indicating that a user has left a certain area). In some implementations, this condition is determined by determining whether a communication connection (e.g., via WiFi, BLUETOOTH, or any other wired or wireless connection components, protocols, and/or techniques) between the first electronic device and the second electronic device has been lost. This may occur, for example, when a user leaves home, and a communication connection between a home audio system and the user's smartphone is terminated.

In some implementations, the predetermined conditions can also include date and time. For example, a user could establish a predetermined condition such that, on weekdays that are not holidays, between the hours of 7 am and 9 am, when the user's smartphone detects the user's car stereo in close proximity to the first electronic device (e.g., because the user has entered the car), the smartphone automatically (e.g., without any direct input by the user) sends a request to the server system to transfer the stream to the car stereo. In some implementations, the first electronic device detects the car stereo by way of Bluetooth technology or other wireless peer-to-peer communication protocols.

In some implementations, the automatically generated request is generated by the first electronic device (704).

In other implementations, the automatically generated request is generated by the second electronic device (706). Thus, in some situations, the second electronic device automatically generates the transfer request to send to the server system. This would be especially useful when the second electronic device has a more reliable connection to the Internet than the first electronic device.

In yet other implementations, the automatically generated request is generated by the server system.

In accordance with some implementations, the server system responds to receiving the transfer request by ceasing to transmit the media content stream to the first electronic device (708). The server system then transmits the media content stream to the second electronic device for presentation by the second electronic device (710).

Figure 8:
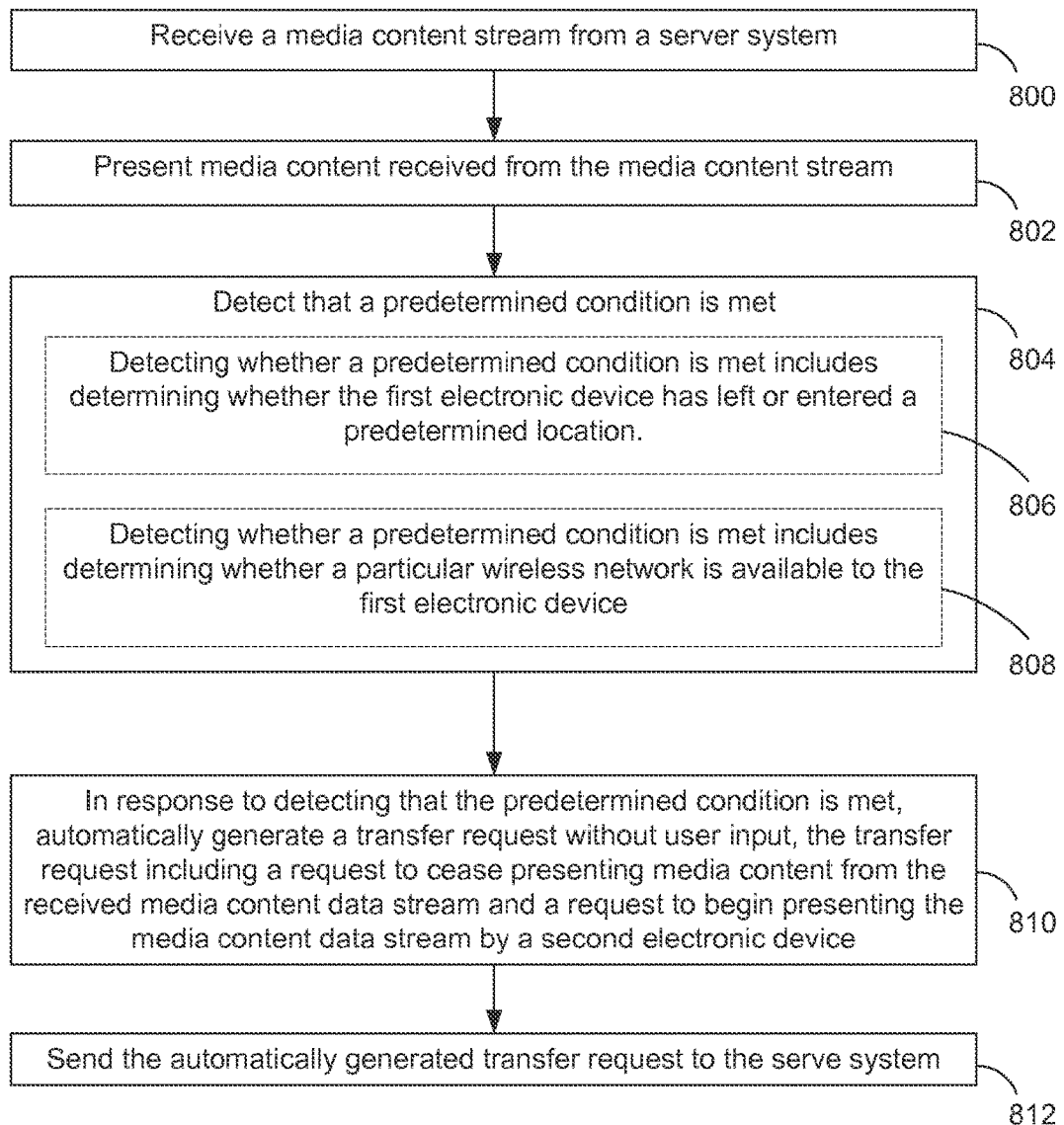
FIG. 8 is a flow diagram illustrating a process of automatically transferring a media content data stream, in accordance with some implementations.

FIG. 8 is a flow diagram illustrating a process of transferring a media content data stream, in accordance with some implementations. Each of the operations shown in FIG. 8 may correspond to instructions stored in a computer memory or computer readable storage medium. In some implementations, the method described in FIG. 8 is performed by an electronic device (e.g., the first or second electronic devices 102-1, 106-1; the server system 120). The following discussion describes the method(s) as being performed by the first electronic device (e.g., the first electronic device 102-1). However, it will be understood that the method(s) described may be performed by any other appropriate device or combination of devices, including client and/or server devices.

In accordance with some implementations, the first electronic device receives a media content stream from a server system (800). The first electronic device then presents the received media content (802). In some implementations, the first electronic device will periodically determine whether a predetermined condition has been met.

When the condition is met, the first electronic device determines that the condition has been met (804). In some implementations, determining that a first condition is met includes detecting through a GPS locator that the device has moved into or out of a predetermined location (806) or detecting whether a particular wireless network is available to the first electronic device (808).

In some implementations, the first electronic device, in response to detecting that the predetermined condition is met, generates a transfer request without user input, the transfer request including a request to cease presenting media content from the received media content data stream and a request to begin presenting the media content data stream at a second electronic device (810).

The electronic device then sends the automatically generated transfer request to the server system (e.g., the server system 120) (812).

Figure 9:
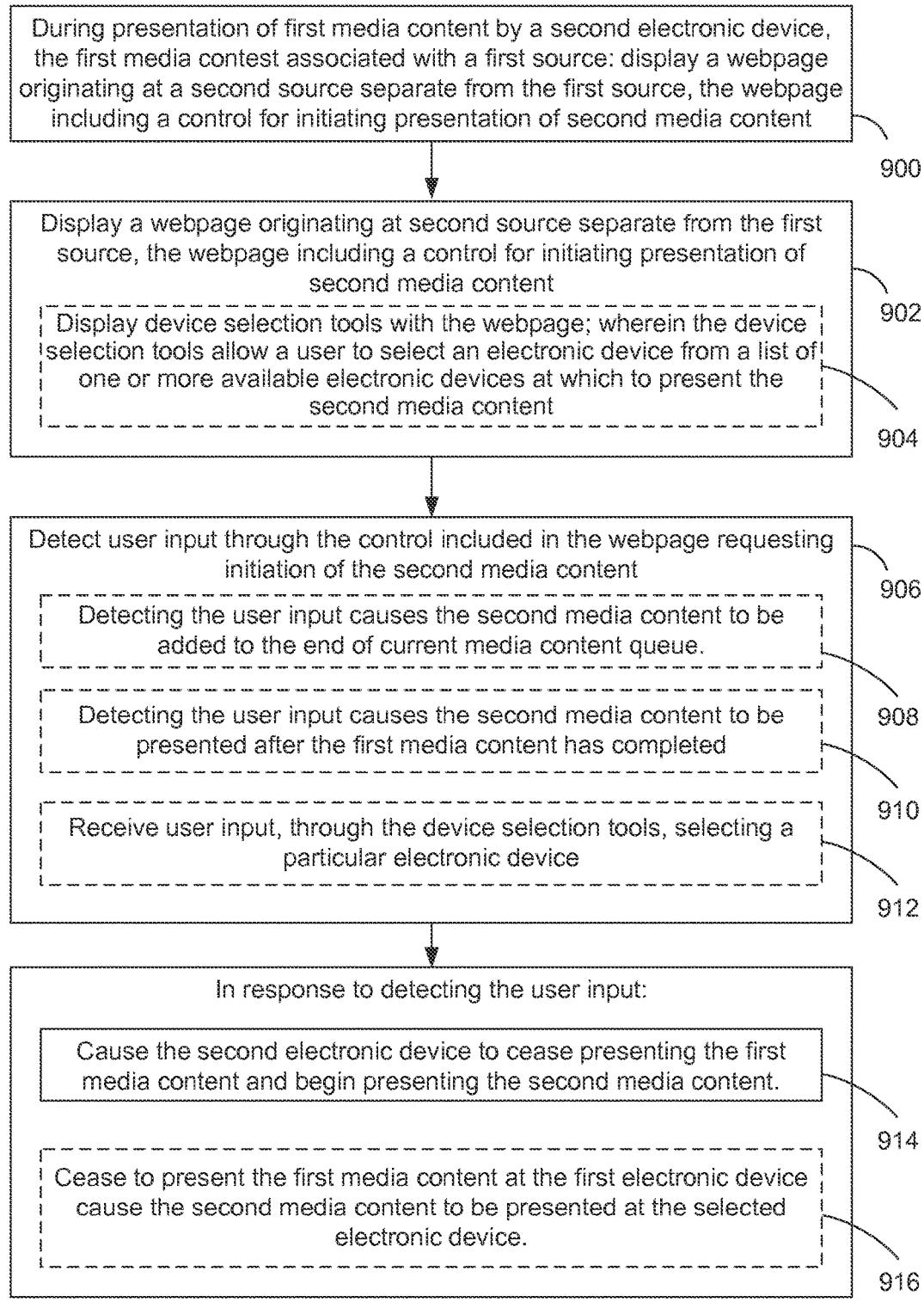
FIG. 9 is a flow diagram illustrating a process of controlling media presentation on a remote device through a control included in a webpage, in accordance with some implementations.

FIG. 9 is a flow diagram illustrating a process of controlling media presentation on a remote device through a control included in a webpage, in accordance with some implementations. Each of the operations shown in FIG. 9 may correspond to instructions stored in a computer memory or computer readable storage medium. In some implementations, the method described in FIG. 9 is performed by an electronic device (e.g., the first or second electronic devices 102-1, 106-1; the server system 120). The following discussion describes the method(s) as being performed by a first electronic device (e.g., the first electronic device 102-1).

However, it will be understood that the method(s) described may be performed by any other appropriate device or combination of devices, including client and/or server devices.

In some implementations, a first electronic device, during presentation of first media content at a second electronic device (e.g., the second electronic device 106-1), displays a webpage originating at a second source separate from the first source, the webpage including a control for initiating presentation of second media content (900). For example, the first electronic device is a mobile device and outputs media content to a home audio/video system for presentation.

The first electronic device displays a webpage originating at a second source separate from the first source, the webpage including a control for initiating presentation of second media content (902). In some implementations, the first electronic device also displays device selection tools with the webpage; wherein the device selection tools allow a user to select an electronic device from a list of one or more available electronic devices at which to present the second media content (904).

In accordance with some implementations, the first electronic device detects user input through the control included in the webpage requesting initiation of the second media content (906). For example, a webpage displays a play button associated with a specific song and the user clicks on it, or otherwise selects it.

In some implementations, detecting the user input causes the second media content to be added to the end of the existing media content queue (908) (e.g., by including the second media at the end of the current playlist or next on the playlist).

In some implementations, detecting the user input causes the second media content to be presented after the first media content has completed (910). For example, a user clicking on the play button will interrupt the presentation of the first media content immediately and begin presenting the second media.

In some implementations, the first electronic device receives a user input, through the device selection tools, selecting a particular electronic device for output (912). For example, the controls in the webpage (e.g., a dropdown/popup menu including images and/or text representing devices) allow the user to select from a list of possible devices to use to present the second media content.

In accordance with some implementations, in response to detecting user input, causes the second electronic device to cease presenting the first media content and begin presenting the second media content (914).

In other implementations, in response to detecting user input selecting an electronic device to present media content, the first electronic device ceases to present the first media content at the first electronic device, and causes the second media content to be presented at the selected electronic device (916).

Figure 10:
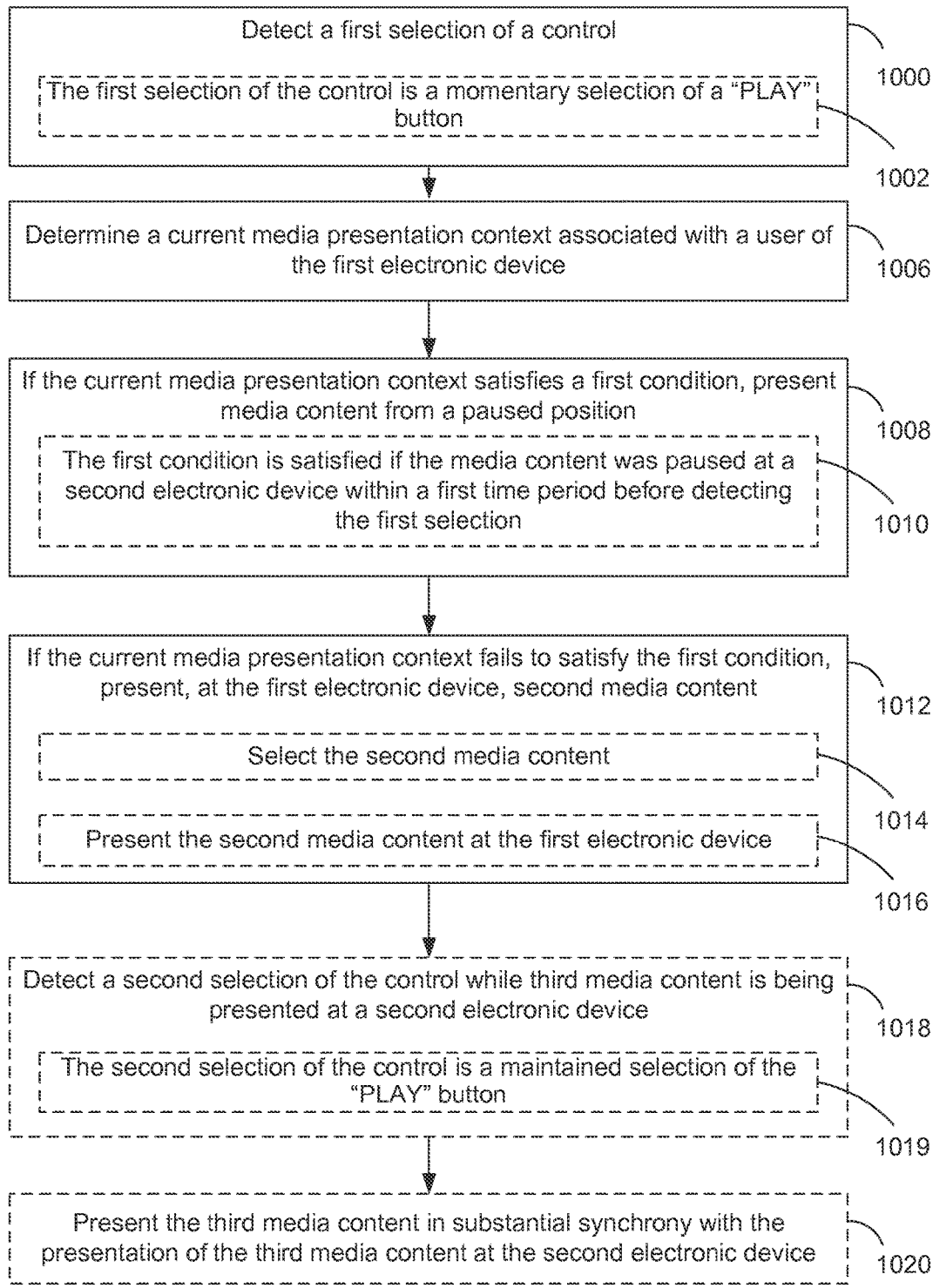
FIGS. 10-11 are flow diagrams illustrating a process of controlling an electronic device, in accordance with some implementations.
Figure 11:
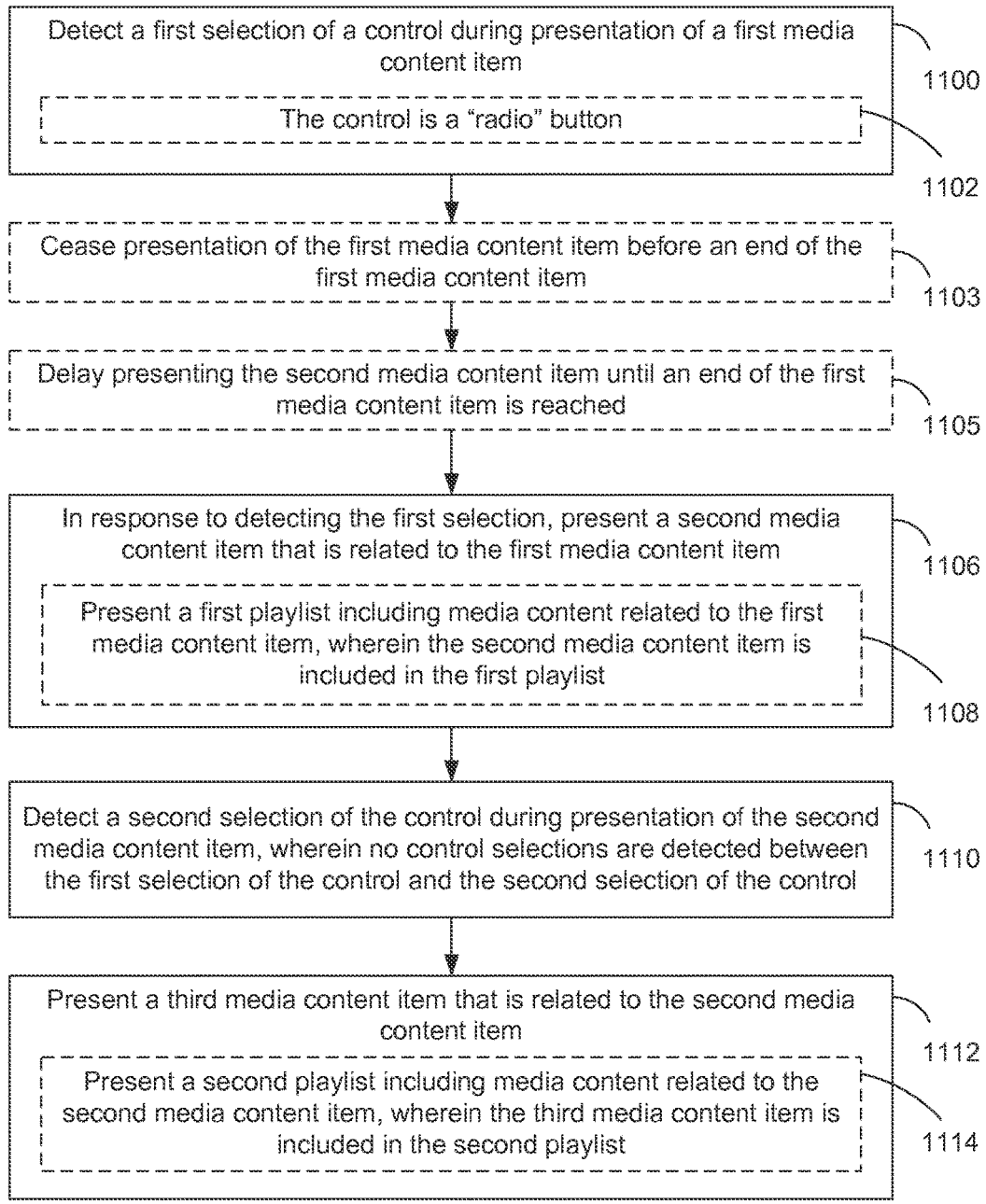

FIGS. 10-11 are flow diagrams illustrating processes of controlling an electronic device, in accordance with some implementations. Each of the operations shown in FIGS. 10-11 may correspond to instructions stored in a computer memory or computer readable storage medium. In some implementations, the methods described in FIGS. 10-11 are performed by an electronic device (e.g., the first or second electronic devices 102-1, 106-1). The following discussion describes the method(s) as being performed by a first electronic device (e.g., the first electronic device 102-1). However, it will be understood that the method(s) described may be performed by any other appropriate device or combination of devices, including client and/or server devices.

The first electronic device detects a first selection of a control (1000). In some implementations, the control is a physical button or switch, while in other implementations, the control is a virtual button (e.g., a selectable element on a touchscreen).

In some implementations, the first selection of the control is a momentary selection of a "PLAY" button (1002).

The first electronic device determines a current media presentation context associated with a user of the first electronic device (1006). In some implementations, the current media presentation context associated with the user includes information about the current state of media content presentation associated with the user, at any device associated with the user. For example, the media presentation context associated with the user of the first electronic device can include an identifier of a media content item (e.g., a song, video, etc.) that is being presented by any device associated with the user, as well as positional data of that content item (e.g., the playback location), an identifier of a playlist or radio station in which the media content is included, etc. As a specific example, the user may be listening to a song on a second electronic device (e.g., a computer), and the first electronic device (e.g., a WiFi enabled speaker system) determines the song that is being played back, and the current playback position in that song. As another specific example, the user may have paused a song at a second electronic device (e.g., a computer), and the first electronic device (e.g., a WiFi enabled speaker system) determines the song that was paused, and the pause position within that song. Other media presentation context information may be determined as well (e.g., a playlist, a volume, etc.). In these examples, the particular devices identified for the first and second electronic devices are exemplary, and other devices are contemplated by these examples as well.

If the current media presentation context satisfies a first condition, the first electronic device presents media content from a paused position (1008). In some implementations, the first condition is satisfied if the media content was paused at a second electronic device within a first time period before detecting the first selection (1010). In some implementations, the predetermined time period is 1, 2, 3, 4, 5, or more minutes (or any other appropriate time period).

If the current media presentation context fails to satisfy the first condition, presenting, at the first electronic device, second media content (1012). For example, in some implementations, the current media presentation context fails to satisfy the first condition when no media content associated with the user was paused within a predetermined time period before detecting the first selection. In some implementations, the predetermined time period is 1, 2, 3, 4, 5, or more minutes (or any other appropriate time period).

In some implementations, presenting the second media content (e.g., step 1012) includes selecting the second media content (1014); and presenting the second media content at the first electronic device (1016). As described above, the second media content may include any of a default media item (e.g., a song), other media items in the user's playlists or play history, a radio station, a sponsored playlist, etc., and selecting the media content (at step 1016) may include selecting media content of any of these types of media content, or other types not mentioned.

In some implementations, the first electronic device detects a second selection of the control while third media content is being presented by a second electronic device (1018). In some implementations, the second selection of the control is a maintained selection of the "PLAY" button (1019).

The first electronic device then presents the third media content in substantial synchrony with the presentation of the third media content at the second electronic device (1020). For example, the first electronic device (e.g., a WiFi enabled speaker system) detects that, at the moment when a user selects a "Play" control, a song is currently being played at the second electronic device (e.g., a computer system). The first electronic device then begins to play back that same song in substantial synchrony with the second electronic device.

With reference to FIG. 11, the first electronic device detects a first selection of a control during presentation of a first media content item (1100). In some implementations, the control is a physical button or switch, while in other implementations, the control is a virtual button (e.g., a selectable element on a touchscreen). In some implementations, the control is a "radio" button (1102).

In some implementations, prior to presenting the second media content item (at step 1106, below), the device ceases presentation of the first media content item before an end of the first media content item (1103). For example, the device immediately stops playing back a currently presented song in order to begin presentation of the next song (e.g., a song in a playlist of songs related to the song that was playing when the "Radio" button was selected).

In some implementations, the first electronic device delays presenting the second media content item (at step 1106, below) until an end of the first media content item is reached (1105). For example, the device waits until the end of the currently presented song before starting to present the next song (e.g., a song in a playlist of songs related to the song that was playing when the "Radio" button was selected).

In response to detecting the first selection, the first electronic device presents a second media content item that is related to the first media content item (1106).

In some implementations, presenting the second media content item includes presenting a first playlist including media content related to the first media content item, wherein the second media content item is included in the first playlist (1108). For example, if a user selects a "Radio" button on a device while the device is playing the song "Killer Queen," the device will begin playing a playlist of similar songs (and/or songs by similar artists).

In some implementations, the second media content item is related to the first media content item based on a similarity between the first and the second media content items in any of the group consisting of: genre, artist, mood, sound, tempo, volume, and key.

The first electronic device detects a second selection of the control during presentation of the second media content item, wherein no control selections are detected between the first selection of the control and the second selection of the control (1110). In response to detecting the second selection, the first electronic device presents (at the first electronic device) a third media content item that is related to the second media content item (1112). Thus, the user need not navigate through multiple menus or provide multiple inputs to the device in order to cause the device to being presenting another sequence of related media content (e.g., a playlist or radio station of songs similar to the song that was playing when the control was selected).

In some implementations, presenting the third media content item includes presenting a second playlist including media content related to the second media content item, wherein the third media content item is included in the second playlist (1114).

In some implementations, the method(s) described with respect to FIGS. 10-11 are performed by or in conjunction with a device that has a set of media control inputs. In some implementations, the set of media control inputs consists essentially of a play button; a pause button; a stop button; a forward skip button; a backward skip button; and a playlist initiation button.

The methods illustrated in FIGS. 5-11 may be governed by instructions that are stored in a computer readable storage medium and that are executed by at least one processor of at least one server. Each of the operations shown in FIGS. 5-11 may correspond to instructions stored in a non-transitory computer memory or computer readable storage medium. In various implementations, the non-transitory computer readable storage medium includes a magnetic or optical disk storage device, solid state storage devices, such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method for controlling a first electronic device, comprising:
   at a server system having one or more processors and memory storing one or more programs for execution by the one or more processors:
      while a media content stream is paused at a second electronic device, distinct from the first electronic device:
         receiving, at the server system, from the second electronic device, a transfer request to transmit the media content stream to the first electronic device, wherein the transfer request is generated without user input at an input device of the second electronic device and the transfer request is generated in response to a determination that a wireless communication connection between the first electronic device and the second electronic device has been disconnected;
         in response to receiving, at the server system, the transfer request that is generated without the user input at the input device of the second electronic device, determining whether the media content stream was paused at the second electronic device within a time period;
         in accordance with a determination that the media content stream was paused at the second electronic device within the time period, transmitting, to the first electronic device, the media content stream from the paused position; and
         in accordance with a determination that the media content stream was not paused within the time period at the second electronic device, transmitting, to the first electronic device, a second media content stream.

2. The method of claim 1, wherein the transfer request includes an identifier of the media content paused at the second electronic device and current playback position of the media content.

3. The method of claim 1, wherein the time period corresponds to the media content being paused at the second electronic device within five minutes.

4. The method of claim 1, wherein the time period is a time period before receiving the transfer request.

5. The method of claim 1, wherein the transfer request is generated based on a detection of a change of state of the second electronic device.

6. The method of claim 1, wherein the transfer request is generated based on detection, by a location sensor of the second electronic device, of movement of the second electronic device with regard to a predefined area.

7. A server system, comprising:
   one or more processors; and
   memory storing one or more programs for execution by the one or more processors, the one or more programs including instructions for:
      while a media content stream is paused at a second electronic device, distinct from a first electronic device:
         receiving, at the server system, from the second electronic device a transfer request to transmit the media content stream to the first electronic device, wherein the transfer request is generated without user input at an input device of the second electronic device and the transfer request is generated in response to a determination that a wireless communication connection between the first electronic device and the second electronic device has been disconnected;
         in response to receiving, at the server system, the transfer request that is generated without the user input at the input device of the second electronic device, determining whether the media content stream was paused at the second electronic device within a time period;
         in accordance with a determination that the media content stream was paused at the second electronic device within the time period, transmitting, to the first electronic device, the media content stream from the paused position; and
         in accordance with a determination that the media content stream was not paused within the time period at the second electronic device, transmitting, to the first electronic device, a second media content stream.

8. A non-transitory computer-readable storage medium storing one or more programs, the one or more programs comprising instructions, which, when executed by a server system, the server system having one or more processors, cause the server system to:
   while a media content stream is paused at a second electronic device, distinct from a first electronic device:
      receive, at the server system, from the second electronic device, a transfer request to transmit the media content stream to the first electronic device, wherein the transfer request is generated without user input at an input device of the second electronic device and the transfer request is generated in response to a determination that a wireless communication connection between the first electronic device and the second electronic device has been disconnected;

in response to receiving, at the server system, the transfer request that is generated without the user input at the input device of the second electronic device, determine whether the media content stream was paused at the second electronic device within a time period;

in accordance with a determination that the media content stream was paused at the second electronic device within the time period, transmit, to the first electronic device, the media content stream from the paused position; and in accordance with a determination that the media content stream was not paused within the time period at the second electronic device, transmit, to the first electronic device, a second media content stream.

* * * * *